United States Patent
Woodson et al.

(10) Patent No.: US 8,169,952 B2
(45) Date of Patent: *May 1, 2012

(54) METHOD AND SYSTEM FOR SELECTIVE APPLICATION OF CELLULAR-PBX INTEGRATION SERVICE

(75) Inventors: Charles E. Woodson, Peculiar, MO (US); Jeffrey F. Phillips, Lees Summit, MO (US); Lyle W. Paczkowski, Mission Hills, KS (US); Mark R. Bales, Kansas City, MO (US); Farni B. Weaver, Spring Hill, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,629

(22) Filed: May 6, 2011

(65) Prior Publication Data

US 2011/0211531 A1 Sep. 1, 2011

Related U.S. Application Data

(63) Continuation of application No. 11/135,875, filed on May 24, 2005, now Pat. No. 8,064,951, which is a continuation-in-part of application No. 10/902,323, filed on Jul. 29, 2004, now Pat. No. 7,406,330.

(51) Int. Cl.
*H04W 4/00* (2009.01)
*H04W 24/00* (2009.01)
*H04M 1/00* (2006.01)

(52) U.S. Cl. .................. 370/328; 455/456.3; 455/554.1; 455/554.2; 455/555

(58) Field of Classification Search .................. 370/328
See application file for complete search history.

(56) References Cited

U.S. PATENT DOCUMENTS

| | | | |
|---|---|---|---|
| 5,818,824 A | 10/1998 | Lu et al. | |
| 5,887,256 A | 3/1999 | Lu et al. | |
| 5,890,064 A | 3/1999 | Widergen et al. | |
| 6,014,377 A | 1/2000 | Gillespie | |
| 6,073,029 A | 6/2000 | Smith et al. | |

(Continued)

FOREIGN PATENT DOCUMENTS

WO    WO 00/78017 A1    12/2000

OTHER PUBLICATIONS

New Step Networks, "Calling Service Node," 2004.

(Continued)

*Primary Examiner* — Patrick Edouard
*Assistant Examiner* — Huy C Ho

(57) ABSTRACT

A method and system for selectively applying a cellular-PBX integration service. When a radio access network (RAN) receives a call request seeking to set up a call for a cellular wireless communication device (WCD) that is operating in the coverage area of the RAN, a determination is made as to whether the WCD is currently checked-into a cellular-PBX integration service. A service control point (SCP), for instance, may make the determination. If the determination is that the WCD is currently checked-in, then the call is set up to an IP PBX server that services the WCD, and the IP PBX server may then handle the call as it would handle a call placed to any IP PBX extension. Further, differential billing can be applied, charging an enterprise billing-account for the call if the WCD is checked-in, and charging a WCD billing-account for the call if the WCD is not checked-in.

19 Claims, 13 Drawing Sheets

U.S. PATENT DOCUMENTS

| | | | |
|---|---|---|---|
| 6,075,855 | A | 6/2000 | Christiansen et al. |
| 6,223,055 | B1 | 4/2001 | Cyr |
| 6,285,879 | B1 | 9/2001 | Lechner et al. |
| 6,317,594 | B1 | 11/2001 | Gossman et al. |
| 6,490,345 | B2 | 12/2002 | Fleischer, III et al. |
| 6,574,470 | B1 | 6/2003 | Chow et al. |
| 6,633,636 | B1 | 10/2003 | McConnell et al. |
| 6,658,259 | B2 | 12/2003 | McIntosh |
| 6,681,119 | B1 | 1/2004 | Verdonk |
| 6,751,204 | B1 | 6/2004 | Foti et al. |
| 6,954,654 | B2 | 10/2005 | Ejzak |
| 6,961,559 | B1 | 11/2005 | Chow et al. |
| 6,982,985 | B1 | 1/2006 | Bohacek et al. |
| 7,065,339 | B2 | 6/2006 | Vallinen et al. |
| 7,181,207 | B1 | 2/2007 | Chow et al. |
| 7,260,384 | B2 | 8/2007 | Bales et al. |
| 7,406,330 | B2 | 7/2008 | McConnell et al. |
| 7,574,213 | B2 | 8/2009 | Gallagher et al. |
| 2001/0046215 | A1 | 11/2001 | Kim |
| 2001/0046859 | A1 | 11/2001 | Kil |
| 2002/0080757 | A1 | 6/2002 | Narvanen et al. |
| 2002/0120748 | A1 | 8/2002 | Schiavone et al. |
| 2002/0122544 | A1 | 9/2002 | Williams et al. |
| 2003/0013489 | A1 | 1/2003 | Mar et al. |
| 2003/0123436 | A1 | 7/2003 | Joseph et al. |
| 2004/0037402 | A1 | 2/2004 | Adamczyk et al. |
| 2004/0072593 | A1 | 4/2004 | Robbins et al. |
| 2004/0114515 | A1 | 6/2004 | Kim |
| 2004/0152442 | A1 | 8/2004 | Taisto et al. |
| 2004/0264410 | A1 | 12/2004 | Sagi et al. |
| 2005/0063359 | A1 | 3/2005 | Jagadeesan et al. |
| 2005/0119005 | A1 | 6/2005 | Segal et al. |
| 2005/0129069 | A1 | 6/2005 | Binder |
| 2005/0190747 | A1 | 9/2005 | Sindhwani et al. |
| 2005/0237978 | A1 | 10/2005 | Segal |
| 2006/0023657 | A1 | 2/2006 | Woodson et al. |
| 2006/0023658 | A1 | 2/2006 | Phillips et al. |
| 2006/0025139 | A1 | 2/2006 | Bales et al. |
| 2006/0025140 | A1 | 2/2006 | Bales et al. |
| 2006/0251113 | A1 | 11/2006 | Jagadeesan et al. |

OTHER PUBLICATIONS

New Step Networks, "Incumbent Service Providers," http://www.newstepnetworks.com/customers_centric1.html, printed from the World Wide Web on Mar. 17, 2004.
New Step Networks, Data Sheet, "Calling Service Node," 2003.
New Step Networks, "Feature Control Points (FCP) Overview," printed from the World Wide Web on Mar. 17, 2004.
Lucent technologies, IP Multimedia Subsystem (IMS) Service Architecture, 2004.
Office action from U.S. Appl. No. 10/902,323, dated May 24, 2006.
Office action from U.S. Appl. No. 10/902,323, dated Aug. 3, 2007.
Notice of allowance from U.S. Appl. No. 10/902,323, dated Dec. 13, 2007.
Office action from U.S. Appl. No. 11/135,899, dated Nov. 22, 2006.
Notice of allowance from U.S. Appl. No. 11/135,899, dated May 16, 2007.
Office action from U.S. Appl. No. 11/135,875, dated Sep. 17, 2007.
Office action from U.S. Appl. No. 11/135,875, dated Mar. 19, 2008.
Office action from U.S. Appl. No. 11/135,875, dated Jun. 3, 2008.
Office action from U.S. Appl. No. 11/135,875, dated Nov. 14, 2008.
Office action from U.S. Appl. No. 11/135,875, dated May 21, 2009.
Office action from U.S. Appl. No. 11/135,875, dated Jan. 20, 2010.
Office action from U.S. Appl. No. 11/135,875, dated Jul.. 6, 2010.
Notice of allowance from U.S. Appl. No. 11/135,875, dated Mar. 16, 2011.
Office action from U.S. Appl. No. 11/136,116, dated Jun. 10, 2009.
Office action from U.S. Appl. No. 11/136,116, dated Dec. 21, 2009.
Office action from U.S. Appl. No. 11/136,116, dated Jun. 22, 2010.
Notice of allowance from U.S. Appl. No. 11/136,116, dated Mar. 3, 2011.
Notice of allowance from U.S. Appl. No. 11/136,116, dated Jul. 20, 2011.
Office action from U.S. Appl. No. 11/135,946, dated Jun. 8, 2009.
Office action from U.S. Appl. No. 11/135,946, dated Mar. 18, 2010.
Office action from U.S. Appl. No. 11/135,946, dated Aug. 23, 2010.
Office action from U.S. Appl. No. 11/135,946, dated Mar. 23, 2011.
Office action from U.S. Appl. No. 11/135,973, dated Sep. 27, 2007.
Office action from U.S. Appl. No. 11/135,973, dated Mar. 24, 2008.
Office action from U.S. Appl. No. 11/135,973, dated Jun. 17, 2008.
Office action from U.S. Appl. No. 11/135,973, dated Sep. 18, 2008.
Office action from U.S. Appl. No. 11/135,973, dated Mar. 5, 2009.
Office action from U.S. Appl. No. 11/135,973, dated Dec. 28, 2009.
Office action from U.S. Appl. No. 11/135,973, dated Jun. 16, 2010.
Office action from U.S. Appl. No. 11/135,973, dated Mar. 16, 2011.
International Search Report from International Application No. PCT/US2005/026583, dated Nov. 28, 2005.
Written Opinion of the International Searching Authority from International Application No. PCT/US2005/026583, dated Feb. 10, 2006.

METHOD AND SYSTEM FOR SELECTIVE APPLICATION OF CELLULAR-PBX INTEGRATION SERVICE

REFERENCE TO RELATED APPLICATIONS

This is a continuation of U.S. patent application Ser. No. 11/135,875, filed May 24, 2005, which is a continuation-in-part of co-owned U.S. patent application Ser. No. 10/902,323, filed Jul. 29, 2004, the entirety of both of which are hereby incorporated by reference.

FIELD OF THE INVENTION

The present invention relates to telecommunications and, more particularly, to cellular wireless communications and private branch exchange communications.

BACKGROUND

Private branch exchange (PBX) systems are well known in the art. In a typical arrangement, an enterprise will operate a PBX server that interfaces between each of the telephone stations in the enterprise and a local telephone company central office of the public switched telephone network (PSTN). Conventionally, each telephone station will have an assigned PBX extension number, and some of the stations may also have direct inbound dial (DID) numbers for receiving calls directly from the PSTN. The PBX server may then provide its stations with many useful features, such as the ability to dial by extension, the ability to transfer calls, the ability to establish conference calls, and the ability to interact with an enterprise voice mail service.

Traditional PBX servers connect with each of their served telephone stations by a respective physical telephone line, which can be inefficient and difficult to manage. Recent improvements in Voice-over-IP communications have made possible an improved form of PBX server, known generally as an IP PBX server. Typically, an IP PBX server sits as a node on an enterprise's computer network (e.g., LAN), and each of the enterprise telephone stations in turn sits as a respective node on the computer network as well. Signaling and bearer communications between the telephone stations and the IP PBX server then traverse the computer network as IP communications. Like a conventional PBX server, the IP PBX server may be coupled to a telephone company central office, so that the enterprise telephone stations can place and receive calls via the PSTN.

An enterprise IP PBX system provides great convenience for users of desktop telephone stations at the enterprise. Increasingly, however, people are often working from home or otherwise on the road, rather than at the office. As such, people frequently use cellular wireless communication devices (WCDs), such as cell phones, rather than their desktop enterprise telephone stations. WCDs place and receive calls through cellular radio access networks, rather than through an IP PBX system. Thus, when on the road, an enterprise worker would not benefit from the features of the enterprise IP PBX system (other than by dialing into the IP PBX system through a DID telephone number.)

SUMMARY

As disclosed herein, an IP PBX system that serves enterprise telephones via a landline IP network connection can be expanded to serve cellular wireless communication devices (WCD) via a cellular wireless carrier's radio access network (RAN). To do so, a signaling and bearer path infrastructure will be placed between the cellular carrier's RAN and the IP PBX system. Calls to and from the cellular WCD can then be selectively connected through the IP PBX system, so that the IP PBX system can control and manage the calls just as the IP PBX would control and manage calls involving other extensions on the IP PBX.

With this arrangement, a cellular WCD can thus become an IP PBX client station, i.e., an extension on an off-the-shelf IP PBX server. As such, in an ideal arrangement, the cellular WCD would seamlessly benefit from many of the same IP PBX features that other more conventional IP PBX client stations would enjoy. Further, the cellular WCD would seamlessly benefit from these features anywhere within coverage of the cellular carrier's network.

By way of example, the cellular WCD can have an assigned PBX extension number and can thus receive inside-calls placed to that extension number from other stations in the IP PBX system and place inside-calls to other stations in the IP PBX system by dialing their extension numbers. As another example, the cellular WCD can ideally transfer an existing call to another extension in the IP PBX system and set up conference calls with other extensions in the IP PBX system. And as another example, the cellular WCD can ideally benefit from a voice mail system associated with the IP PBX system, so that unanswered calls to the cellular WCD can be forwarded to the voice mail system, and a user of the cellular WCD can readily access the voice mail system to listen to messages. Further, the cellular WCD can ideally dial IP PBX feature codes to access various features of the IP PBX system.

At the same time, the cellular WCD would ideally maintain a public directory number and could thus receive outside calls placed to that directory number and place outside calls from that directory number. Further, as a client device served by a cellular carrier, the cellular WCD would ideally benefit from another voice mail system associated with the cellular carrier, so that unanswered calls to the cellular WCD could alternatively be forwarded to the cellular carrier's voice mail system. And still similarly, the cellular WCD would ideally be able to dial feature codes and invoke other features that are specific to the cellular carrier's system.

In accordance with exemplary embodiments described more fully below, still additional methods and systems can be provided in order control or limit application of this cellular-PBX integration function. In one respect, for instance, a user (e.g., end-user or system administrator) can be given the ability to selectively turn on or off the cellular-PBX integration function for a given cellular WCD, either generally, according to a user-defined schedule, or on a per-call basis. In another respect, location of the WCD can be used as a basis to determine whether to apply the cellular-PBX integration function, such as by restricting operation of the cellular-PBX integration function to when the WCD is in a home zone or other designated location. In still another respect, an account-balance limitation can be imposed on application of the cellular-PBX integration function, such as by limiting a given WCD to using the function for only a certain number of minutes per month for instance.

In yet another respect, a method and system can be applied to determine dynamically which of cellular WCD's voice mail systems should be applied in a given instance, that is, whether to apply the WCD's "enterprise" (PBX-based) voice mail system and when to apply the user's the WCD's "personal" (cellular-carrier based) voice mail system. In this regard, an interactive voice response unit (IVRU) could prompt a caller in real time to select which of these or other voice mail systems should handle an unanswered or busy call.

Alternatively, calls could be routed to the WCD's enterprise voice mail system when the cellular-PBX integration function is turned on for the WCD and to the WCD's personal voice mail system when the cellular-PBX integration function is turned off for the WCD.

Still further, in another respect, a method and system can be applied to facilitate differential billing, so as to cause a cellular carrier to bill cellular-PBX integration calls to an enterprise while billing traditional cellular calls to the WCD account holder.

These and other aspects, advantages, and alternatives will become apparent to those of ordinary skill in the art by reading the following detailed description, with reference where appropriate to the accompanying drawings. Further, it should be understood that the descriptions in the foregoing summary and elsewhere herein are intended to be examples only rather than necessary limitations of the claimed invention.

DETAILED DESCRIPTION

1. Base Network Architecture

Figure 1:
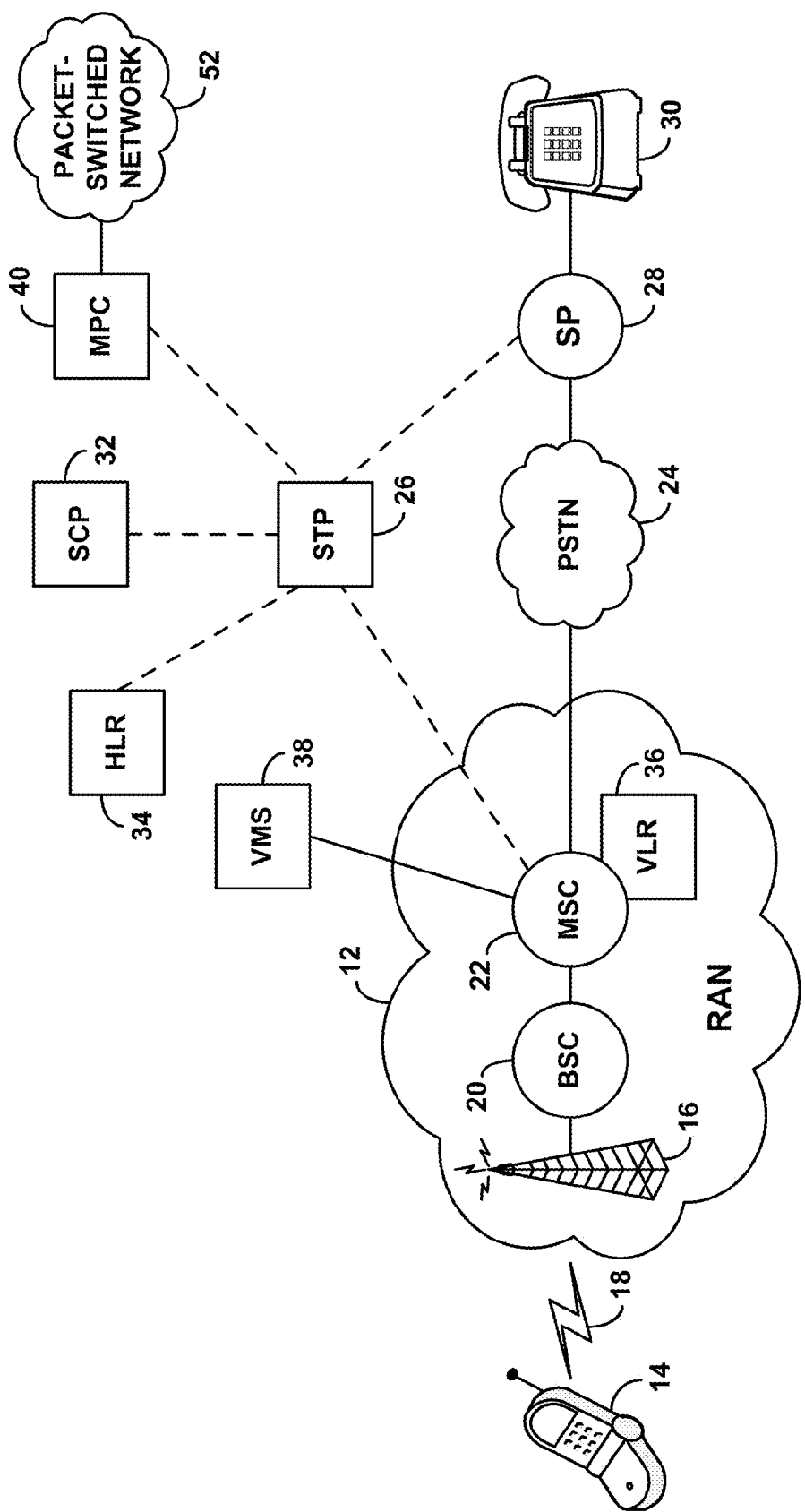
FIG. 1 is a block diagram depicting a cellular wireless communication system.
Figure 2:
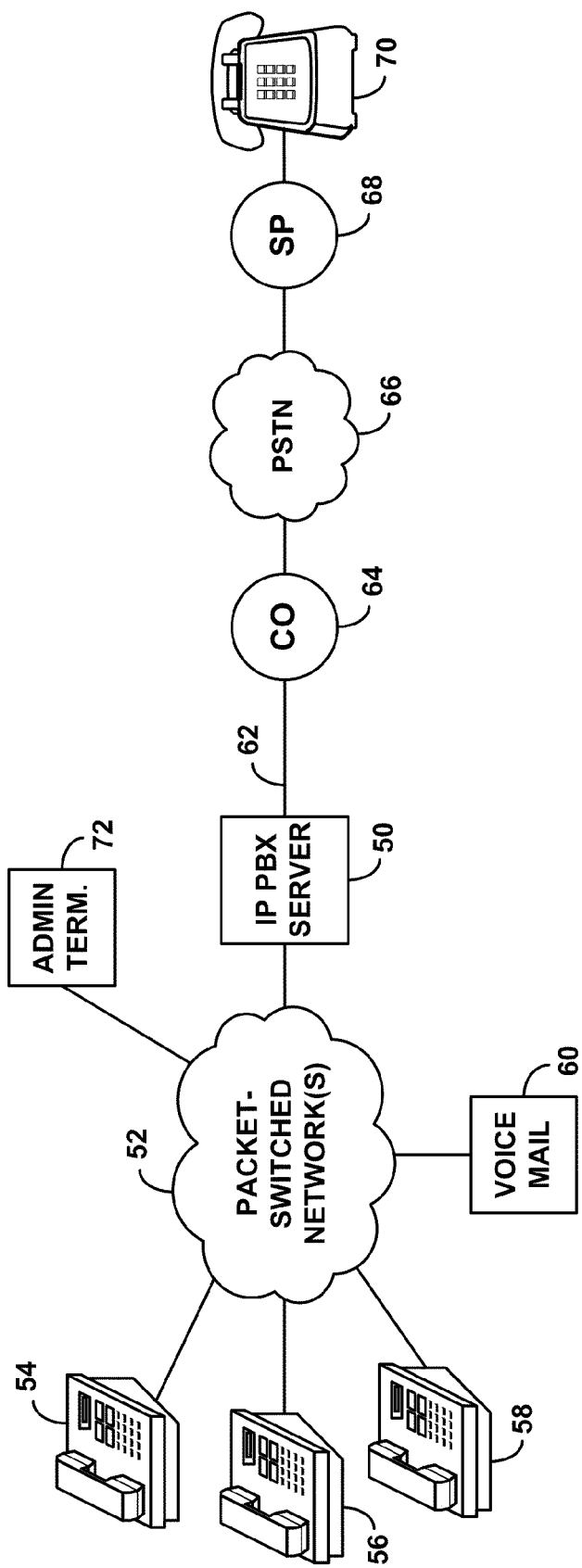
FIG. 2 is a block diagram depicting a basic IP PBX system.

To provide some perspective for the embodiments described below, FIG. 1 is a block diagram depicting the arrangement of a basic cellular wireless communication system, and FIG. 2 is a block diagram depicting the arrangement of a basic IP PBX system. It should be understood, of course, that these are merely examples and that other arrangements of cellular wireless systems and IP PBX systems are equally possible.

a. Cellular Wireless Communication System

As shown first in FIG. 1, a typical cellular wireless communication system includes at its core a radio access network (RAN) 12, which serves one or more wireless communication devices, such as WCD 14 for instance. The RAN 12 includes a base transceiver station (BTS) 16, which radiates to define an air interface 18 through which WCD 14 can communicate, and a base station controller (BSC) 20 that manages air interface communications. Further, the RAN includes a mobile switching center (MSC) 22 or other switching point that provides connectivity with the PSTN 24.

MSC 22 is coupled with an out of band signaling network, represented in FIG. 1 by signal transfer point (STP) 26, through which MSC 22 can engage in signaling to set up calls, to obtain call processing guidance, to acquire profile logic for the WCDs that it serves. To set up a call over the PSTN, for instance, MSC 22 may conventionally engage in SS7 (Integrated Services Digital Network (ISDN) User Part, or "ISUP") signaling via STP 26 with a remote switching point (SP) 28 that serves a remote telephone device 30. To obtain call processing guidance, MSC 22 may send a query message via STP 26 to a service control point (SCP) 32 or other entity and may then receive a call-handling directive from that entity. To acquire profile logic for a served WCD, MSC 22 may receive a service profile for the WCD from a home location register (HLR) 34, via the STP 26, and MSC 22 may store that profile in a visitor location register (VLR) 36 for reference.

With this basic arrangement, WCD 14 can place and receive calls over PSTN 24. For instance, to place a call to remote telephone device 30, WCD 14 may send a call origination message over an access channel on air interface 18 to RAN 12, which would provide MSC 22 with dialed digits representing the telephone number of device 30.

Pursuant to logic defined generally for the MSC or logic defined specifically by the WCD's service profile, MSC 22 may then pause call processing and query up to SCP 32 to obtain call processing guidance. For instance, MSC 22 may send an IS-41 "Origination Request" (ORREQ) message via STP 26 to SCP 32, providing SCP 32 with the calling and called telephone numbers and any other pertinent information. SCP 32 may then apply service logic to decide how the call should be handled and send a call handling directive via STP 26 to MSC 22. And MSC may then carry out that directive.

In a normal case (absent some contrary directive), MSC 22 would direct BSC 20 to assign an air interface traffic channel over which WCD 14 can communicate. Further, MSC 22 would work to set up a call path to the called device 30, typically by engaging in SS7 ISUP signaling. For instance, MSC 22 may first send an ISUP "Initial Address Message" (IAM) via STP 26 to SP 28. SP 28 would then reserve a trunk for the call and send an ISUP "Address Complete Message" (ACM) via STP 26 to MSC 22, indicating the port/trunk reserved. MSC 22 would then connect the call through to that trunk and send a ringing tone to the calling WCD 14. When the called party answers (goes off hook), SP 28 would in turn send an ISUP "Answer Message" (ANM) to the MSC to complete call setup, and the call would then commence.

Similarly, if MSC 22 receives a signaling message (such as an IAM message) from SP 28 seeking to set up a call to WCD 14 from device 30, MSC 22 may query SCP 32 for call processing guidance, and, assuming the call should go through, MSC 22 may page WCD 14 over a paging channel on air interface 18 and may direct BSC 20 to assign a traffic channel through which WCD 14 can communicate. When WCD 14 answers the call, MSC 22 may signal back to SP 26 to complete setup of a call path through PSTN 24, so that the call can commence.

As further shown in FIG. 1, MSC 22 may be coupled by a voice trunk with a voice mail server (VMS) 38. In traditional practice, when MSC 22 receives a request to set up a call to WCD 14, if the call is unanswered, busy, or otherwise not connectable, MSC 22 may route the call to VMS 38 for handling in a manner well known in the art.

In addition, FIG. 1 depicts another feature commonly found in most cellular wireless systems, namely, a mobile positioning center (MPC) 40. MPC 40, which is conventionally coupled with STP 26, functions to determine the location of a WCD and to store and report that location, in order to facilitate various location-based services such as 9-1-1 call-handling for instance. In practice, MPC 40 receives a request for a WCD's location and then responsively invoke a process well known in the art to determine the location (if not already known). For instance, MPC 40 or an associated position determining entity may engage in signaling (via MSC 22)

with the WCD 14, to obtain a granular GPS location reading. Alternatively, MPC 40 may simply engage in signaling with MSC 22 or HLR 18 to determine the cell or cell sector in which the WCD is currently operating (or was last registered). MPC 40 can determine a WCD's location in other ways as well. As shown, MPC 40 may be coupled with a packet-switched network 52, through which MPC 40 may receive and respond to location-requests.

b. IP PBX System

As shown next in FIG. 2, a typical IP PBX system includes at its core an IP PBX server 50, such as one manufactured by Avaya Inc. (e.g., the "Communications Manager" platform), Cisco Systems, Inc. (e.g., the "Avid" platform), Nortel Networks, Ltd. (e.g., the "MCS" platform), or 3Com Corporation (e.g., the "NBX" platform), for instance. The IP PBX server 50 normally sits as a node on a packet-switched network 52, which typically comprises an enterprise local area network (LAN) but could take other forms as well.

Communicatively linked with the packet-switched network 52 are then multiple end-user telephone stations, represented in FIG. 2 by devices 54, 56, 58, each of which may have an extension defined by IP PBX server 50. Each of these telephone stations may be a voice over IP (VoIP) telephony device (such as an IP telephone, IP fax machine, multi-media computer, media terminal adapter, analog terminal adapter, or other device) that is capable of engaging in packetized bearer and signaling communication with the IP PBX server 50 so as to communicate real time media such as voice, video or audio, or other data or information (e.g., fax or modem data) that is normally carried over a telephone line. Also linked with the packet-switched network is an enterprise voice mail server 60. The enterprise voice mail server 60 may be integrated as a function of the IP PBX server 50 or, as shown, may exist as a separate component.

IP PBX server 50 is coupled via one or more T1 lines, PRI lines, or other high capacity circuit link 62 with a local telephone company central office (CO) 64, which provides connectivity with the PSTN 66. In a usual arrangement, the link between IP PBX server 50 and CO 64 may carry multiple subscriber (local loop) telephone lines, each providing a direct dial line for the enterprise. Through this link and the IP PBX server 50, the enterprise telephone stations can place and receive calls over the PSTN 66.

IP PBX server 50 normally includes or has access to configuration data (not shown) for each of the enterprise telephone stations that it serves. For each station, the configuration data defines a PBX extension and other service parameters and preferences, such as preferences to have unanswered calls forwarded to the enterprise voice mail server 60, and the like. Further, the configuration data may correlate DID numbers with certain stations, so as to allow PSTN calls to be placed directly to those stations (rather than being placed to a main IP PBX number and from there being transferred to the stations).

One or more computer terminals sitting on the network 52 or coupled directly with IP PBX server may be used to provision the configuration data for the various telephone stations. For instance, an administrator terminal 72 may run a provisioning program or provide access to a web-based provisioning program, through which an administrator can set up and manage IP PBX configuration parameters for the various telephone stations.

In practice, the enterprise telephone devices will engage in signaling communication with the IP PBX server 50 using a proprietary or standard signaling protocol to set up and manage calls. By way of example, suitable protocols include H.323 and Session Initiation Protocol (SIP), each of which are well known. Using SIP, for instance, an enterprise telephone station could send an IP-based SIP "INVITE" message to the IP PBX server 50, in an effort to set up a call to another extension on the IP PBX server or a call to an outside telephone number.

If the call is an inside call, the IP PBX server 50 may then send a SIP INVITE in turn to the called station, to cause the station to ring. When the called station answers, the called station may respond to the IP PBX server 50 with a SIP "200 OK" message, and the IP PBX server 50 may in turn respond to the calling station with a SIP 200 OK message. After further SIP signaling, a VoIP (e.g., Real-time Transport Protocol) voice session would be set up between the calling and called stations, so that users of the stations can communicate with each other. If the call is an outside call, on the other hand, the IP PBX server 50 may forward (or allow pass-through of) the digits dialed by the calling station, via link 62, to CO 64, and CO 64 may set up the call over PSTN 66 to the called party.

During an ongoing call that an enterprise telephone station establishes through IP PBX server 50, a signaling path remains between the enterprise telephone station and the IP PBX server 50. Further, in some cases (such as with outside calls), the bearer path of the call also passes through the IP PBX server 50. Consequently, during an ongoing call, a user of the enterprise telephone station can invoke IP PBX functions, such as call transfer, conference calling, or the like.

As noted above, an IP PBX server 50 will sit as a node on one or more IP networks. Typically, for instance, the IP PBX server will sit as a node on an enterprise LAN and will be located physically at the enterprise premises. In that case, the enterprise will typically buy or lease the IP PBX server 50 and will manage operation of the server. Unfortunately, however, this can be a burden for the enterprise.

In an alternative arrangement, the IP PBX server 50 can be physically hosted and managed by a telecom carrier or other entity outside of the enterprise and can be coupled by a packet-data connection with the enterprise network. That way, the outside entity can provide IP PBX service for the enterprise, while relieving the enterprise of much of the responsibility for acquiring and managing an IP PBX server of its own. In this alternative arrangement, the network cloud 52 shown in FIG. 2 between the IP PBX server and the enterprise telephone stations may include both the enterprise network and one or more external IP networks or other communication links, such as the Internet and a telecom carrier's core packet-data network for instance.

In this alternative arrangement as well, the IP PBX server 50 may maintain configuration data for each of the enterprise telephone stations and may engage in signaling communication (e.g., SIP or H.323) with the enterprise telephone stations to set up and manage both inside and outside calls. Further, an administrator terminal 72 located at the enterprise network or elsewhere could be arranged to provision configuration data on the IP PBX server 50.

2. Cellular-PBX Integration

Figure 3:
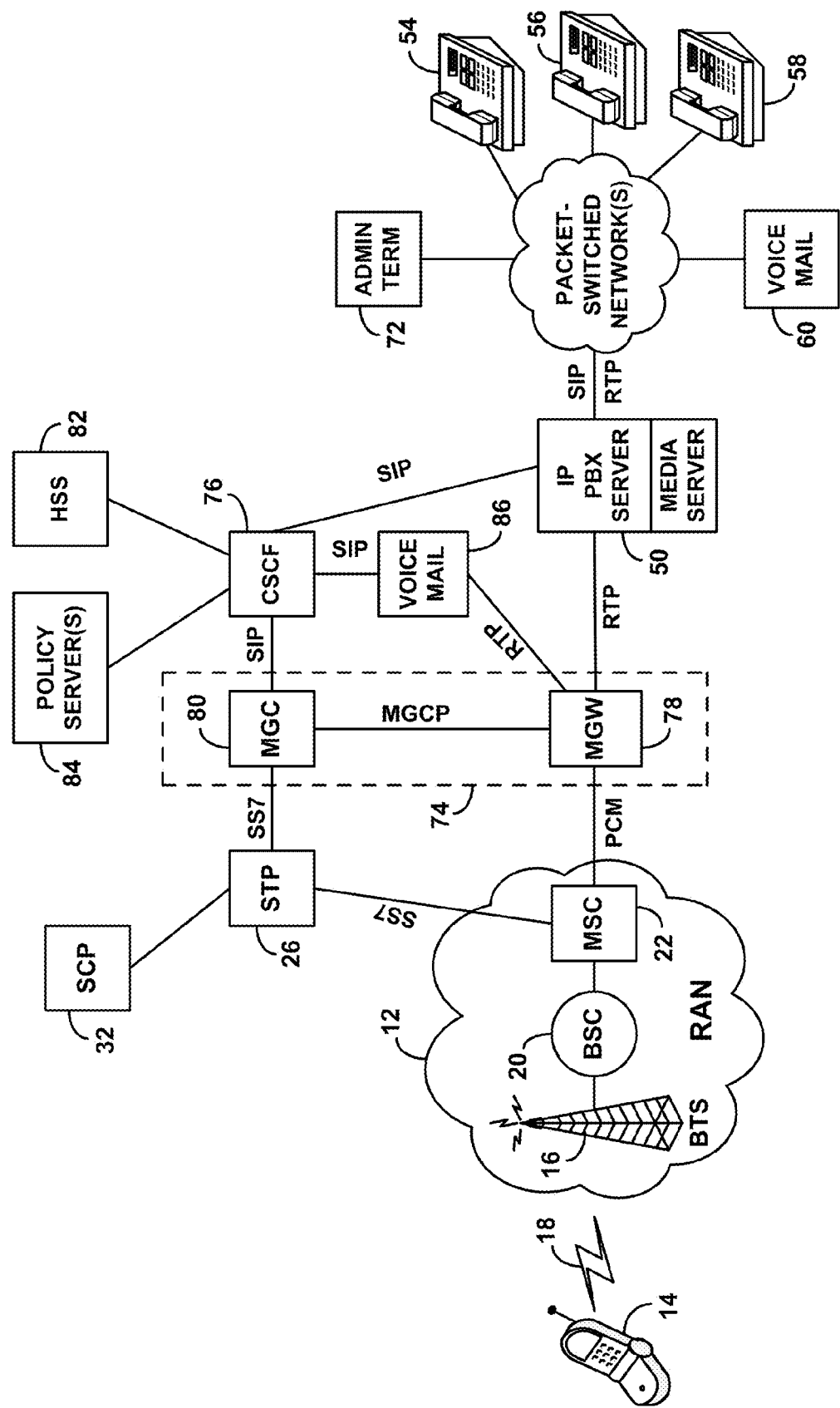
FIG. 3 is a block diagram depicting exemplary signaling and bearer path infrastructure between a carrier's RAN and an IP PBX server.
Figure 4:
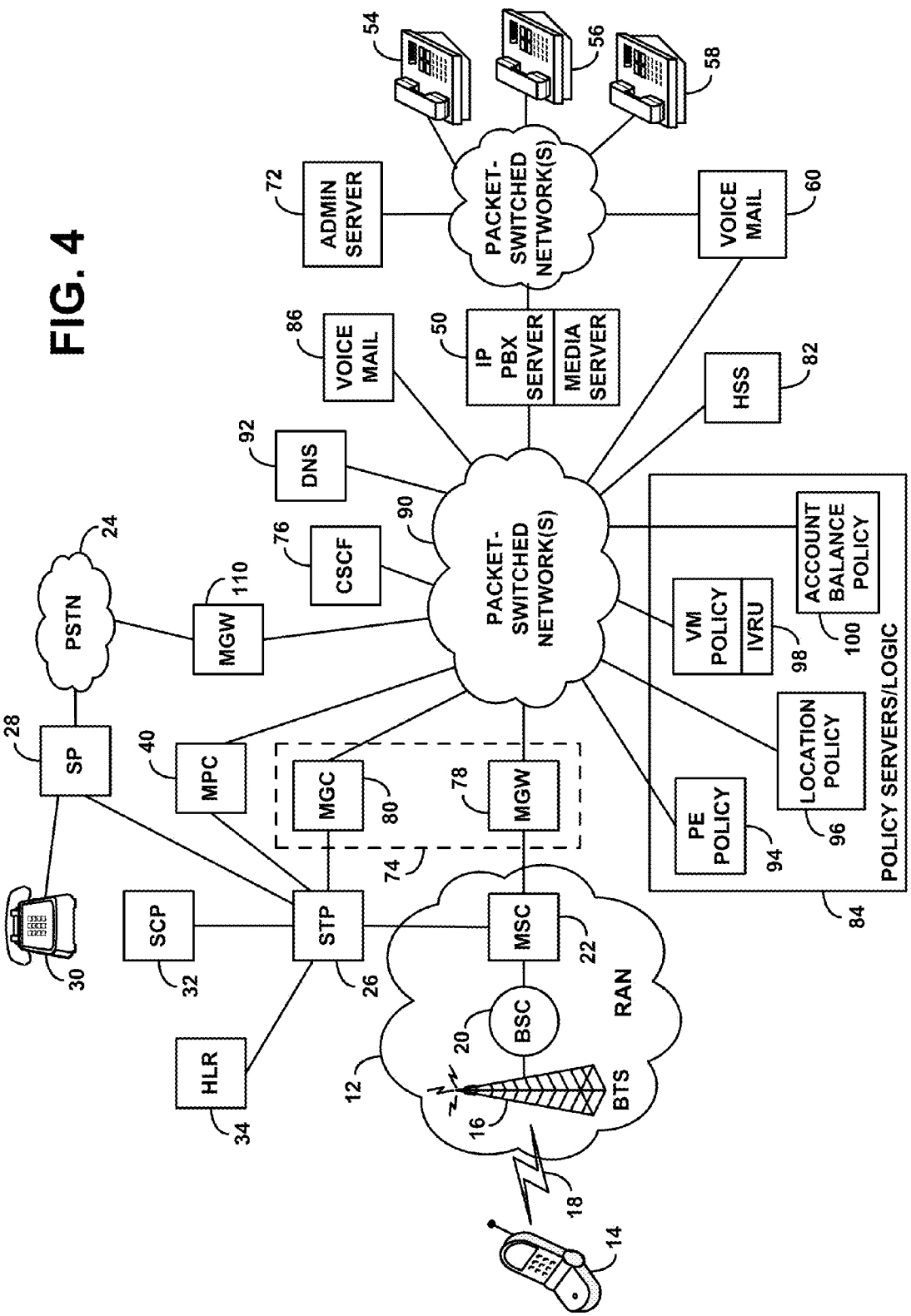
FIG. 4 is a block diagram depicting a network arrangement providing the exemplary signaling and bearer path infrastructure between the RAN and the IP PBX server.

In accordance with the exemplary embodiment, an IP PBX system that serves enterprise telephone stations will be expanded to serve cellular wireless communication devices via a conventional cellular RAN. To accomplish this, as noted above, a signaling and bearer path infrastructure will be placed between the cellular carrier's RAN and the IP PBX system. Calls to and from cellular WCDs will then be connected through the IP PBX system (or at least with signaling passing through the IP PBX system), so that the IP PBX system can control and manage the calls just as the IP PBX system would control and manage calls involving other extensions on the IP PBX. FIGS. 3 and 4 are simplified block diagram depicting an example network arrangement for integrating an IP PBX system and a cellular wireless communication system in this manner. It should be understood, however, that other arrangements are possible as well.

As shown in FIG. 3, an exemplary signaling and bearer path infrastructure between a cellular carrier's RAN 12 and an IP PBX server 50 includes a media gateway system 74 and a call session control function (CSCF) 76.

In a preferred embodiment, the media gateway system 74 includes a media gateway (MGW) 78, which converts between bearer data formats used in the PSTN (such as a pulse code modulated (PCM) format or another time division multiplex (TDM) format) and bearer data formats used for IP-based communication (such as a Real-time Transport Protocol (RTP) format). Further, the media gateway system 74 includes a media gateway controller (MGC) 80, which converts between signaling formats used to set up and manage calls in the PSTN (such as SS7 signaling) and signaling formats used to set up and manage calls over IP (such as SIP or H.323). MGW 78 and MGC 80 can be integrated together or can be distributed, and they can be programmed to communicate with each other through an accepted gateway control protocol such as H.248 or Media Gateway Control Protocol (MGCP) for instance. Media gateway system 74 can take other forms as well.

Call session control function (CSCF) 76 serves as a trigger point to invoke various policy logic when setting up a communication in the integrated cellular-PBX system. As shown, CSCF 76 preferably includes or has access to a subscriber profile store such as a home subscriber server (HSS) 82, which contains profile data for subscribers to the inventive service. CSCF 76 further includes or has a communication link with various policy servers 84, which contain policy logic for determining how to handle particular communication setup requests and the like. CSCF 76 is then coupled with IP PBX server 50, so as to facilitate signaling with the IP PBX server. Further, CSCF 76 is coupled with one or more voice mail servers 86, so as to facilitate signaling with the voice mail server(s).

MGC 80 functions to pass session setup and control signaling between STP 26 (e.g., as SS7 signaling) and CSCF 76 (e.g., as SIP signaling). MGW 78, in coordination with MGC 80, functions to pass bearer traffic between MSC 22 (e.g., as PCM data) and IP PBX server 50 (e.g., as RTP data) or voice mail server(s) (also e.g., as RTP data).

FIG. 4 next depicts more specifically a preferred network arrangement providing the exemplary signaling and bearer path infrastructure between RAN 12 and IP PBX server 50. As shown in FIG. 4, one or more packet-switched networks, cooperatively shown as network cloud 90, sits between media gateway system 74 and IP PBX server 50. Sitting as nodes on network 90, in addition to the MGW 78, MGC 80, and IP PBX server 50, are CSCF 76, HSS 82, policy servers 84, and voice mail server(s) 86. Additionally sitting as nodes on the network 90 are MPC 40 to be used for location-determination, and an ENUM and/or DNS server 92 to be used to facilitate routing of IP traffic.

In the arrangement shown, policy servers 84 include a personal-enterprise (PE) policy server 94, a location policy server 96, a voice mail policy server 98, and an account balance policy server 100. These policy servers can be embodied as discrete server cards and can all be housed together in a chassis, such as an IBM Blade Server, for instance, each with its own IP address. Alternatively, the policy servers could be embodied as server functions in the form of program logic modules all executable by one or more common processors. Preferably, CSCF 76 is programmed to reference, query, and/or route signaling messages (such as SIP messages) through these or other policy servers.

With the arrangement as illustrated in FIGS. 3 and 4, a bearer communication path extends between MSC 22 and IP PBX server 50 via MGW 78. In particular, a circuit link such as a PSTN voice trunk extends between MSC 22 and MGW 78, and a packet-link such as an Ethernet line or packet-switched network extends between MGW 78 and IP PBX server 50. Bearer telephony traffic may therefore flow between MSC 22 and MGW 78 as PCM data or in any other form(s) in which bearer telephony traffic can flow between MSC 22 and another switching point on the PSTN. And bearer telephony traffic may flow between MGW 78 and IP PBX server 50 as RTP/IP data or in any other form(s) in which bearer telephony traffic can flow over a packet-switched network. MGW 78 would then operate to convert between these forms of bearer traffic so as to allow end-to-end bearer communication between the MSC 22 and the IP PBX server 50.

Further, a signaling path extends between MSC 22 and IP PBX server 50 via MGC 80 and CSCF 76. In particular, an SS7 signaling path extends between MSC 22 and MGC 80 via STP 26, just as an SS7 signaling path would normally extend between MSC 22 and another PSTN switching point via STP 26. An IP-based signaling path such as an Ethernet link or packet-switched network extends between MGC 80 and CSCF 76. Similarly, an IP-based signaling path also extends between CSCF 76 and IP PBX server 50. SS7 signaling traffic may then flow between MSC 22 and MGC 80, and IP-based signaling traffic, such as SIP or H.323 traffic, may flow between MGC 80 and IP PBX server 50 via CSCF 76. MGC 80 would operate to convert between these forms of signaling traffic so as to allow end-to-end signaling communication between MSC 22 and IP PBX server 50.

As further shown in FIG. 3, IP PBX server 50 may include or be connected with a media server (or, more generally, a media server function), to facilitate engaging in RTP or other bearer communication with MSC 22, via MGW 78. For instance, if the IP PBX server is an Avaya S8700 PBX server, the media server could be an Avaya G600 media server. The IP PBX server and media server can be separately coupled with the CSCF 76, or they may have a common packet-data link (e.g., a common network or router connection) with the CSCF 76.

In a preferred embodiment, the wireless carrier that owns and operates RAN 12 will position MGW 78 at the same physical site as the MSC 22, so as to facilitate easy shunting of calls between the MSC 22 and the MGW 78. (As presently envisioned, a carrier that operates many MSCs may position a respective MGW 78 at each MSC site.) Further, the carrier may position the MGC 80 as a node on its core signaling network, so as to facilitate SS7 signaling between the MSC 22 and the MGC 80, and the carrier may position MGC 80, CSCF 76, and other entities on a core packet network, to facilitate packet-based signaling between those entities.

At each MSC site, for instance, the carrier may connect the MGW 78 by an inter-machine trunk (IMT) or primary rate interface (PRI) line to a switch port of MSC 22. Further, the carrier may couple the MGW 78 with a packet-data connection (e.g., Ethernet link, carrier's core packet network, Internet, etc.) to the MGC 80, to facilitate H.248, MGCP or other signaling between the MGW 78 and the MGC 80. Further, the carrier may couple the MGC 80 with a similar packet-data connection to the CSCF 76, and the CSCF 76 with a similar packet-data connection to the IP PBX server 50, to facilitate IP-based signaling communication between the MGC 80 and the IP PBX server 50. In addition, the carrier may couple the MGW 78 with a packet-data connection to the IP PBX server 50 (and/or media server), to facilitate bearer communication between the MGW 78 and the IP PBX server 50.

As noted above, an IP PBX server 50 can sit on the enterprise network or can be hosted outside of the enterprise. (As will be described below, an IP PBX system 50 can alternatively comprise both an IP PBX server on the enterprise network and an IP PBX server outside of the enterprise network.) In the scenario where the IP PBX server 50 resides on the enterprise network, the packet-data connection between the MGW 78 and the IP PBX server 50 could include the carrier's core packet network and the Internet or other link, and the packet-data connection between the CSCF 76 and the IP PBX server 50 could similarly include the carrier's core packet network and the Internet or other link. Further, the enterprise network would provide packet-data connectivity between the IP PBX server 50 and the enterprise telephone stations.

In the scenario where the IP PBX server 50 is hosted outside of the enterprise network, such as on the carrier's core packet network for instance, the packet-data connections between the MGW 78 and the IP PBX server 50 and between the CSCF 76 and the IP PBX server 50 could similarly be the carrier's core network or could take some other form. Further, the carrier would couple IP PBX server 50 with a packet-data connection (including, for instance, the carrier's core network and the Internet) to the enterprise network, so that the IP PBX server 50 can engage in IP-based signaling and bearer communication with the enterprise telephone stations and/or other entities on the enterprise network.

Various entities shown in FIGS. 3 and 4 will preferably be configured with logic to facilitate operation of the invention. By way of example, each entity may include or have access to one or more processors (e.g., general purpose and/or special purpose processors), one or more data storage elements (e.g., volatile and/or non-volatile storage), and one or more communication interfaces (e.g., Ethernet network interface modules, or other interfaces) to facilitate communication over the various links shown. The data storage of each entity may contain reference data and/or program instructions (e.g., machine language instructions) executable by a processor (i.e., one or more processors) to carry out various functions described herein. Alternatively, the entities can include hardware or firmware, or any combination of hardware, firmware, and/or software, designed to carry out the functions.

HLR 34, for instance, may include or have access to profile records or other service logic for subscribers, such as a profile record for WCD 14 for instance. The profile record or other service logic may define wireless intelligent network (WIN) trigger logic for causing MSC 22 to query SCP 32 for call processing guidance when MSC 22 is faced with a request to set up a call for (i.e., to or from) WCD 14. Conventionally, HLR 34 would send such logic to MSC 22 (e.g., in an IS-41 registration notification response or qualification directive) for storage in VLR 36, when WCD 14 registers in the service area of MSC 22, when the logic in HLR 34 gets updated, or at other times.

SCP 32 may similarly include or have access to a profile record or other service logic for WCD 14. The profile record may include an indication of whether the WCD subscribes to cellular-PBX integration service, and whether the service is currently active or inactive for the WCD, that is, whether or not the service is to be applied for the WCD. The profile record or other service logic in SCP 32 may thus indicate that, when MSC 22 is faced with a request to set up a call for WCD 14, MSC 22 should set up the call to media gateway system 74, i.e., by engaging in SS7 signaling with MGC 80. As will be explained below, the logic in SCP 32 may also indicate that, if a call to WCD 14 has already been routed to IP PBX server 50 and back to MSC 22, the call should not again be routed to IP PBX server 50 (to avoid endless looping).

HSS 82 may similarly include or have access to a profile record or other service logic for WCD 14. This profile record may similarly include an indication of whether the WCD subscribes to cellular-PBX integration service, and whether the service is currently active or inactive for the WCD. The profile record or other service logic in the HSS 82 may indicate that, when CSCF 76 is faced with a request to set up a call for a WCD 14, the CSCF should route call setup signaling to one or more entities, such as to one or more of the policy servers 84 for instance.

For instance, based on a telephone number URI in the "To" or "From" field of a SIP INVITE message, the CSCF 76 may obtain from HSS 82 a particular domain name, such as "pe-policy.com", "location-policy.com", "voicemail-policy.com" or "account-balance-policy.com" and may then dip into DNS server 92 to resolve that domain name into a routable IP address and then send the INVITE (or a corresponding INVITE) to that IP address. Further, upon receipt of such a signaling message, the policy server itself may dip into the HSS 82 to obtain service logic parameters for the calling party or called party. The policy server may then further modify or reform the signaling message and pass it back or along to CSCF 76, which may then carry out a designated service policy.

IP PBX server 50, as well, may include or have access to profile data or service logic for WCD 14. In a preferred embodiment, the profile data or service logic of IP PBX server 50 would define configuration data for WCD 14, which would assign an IP PBX extension number to the WCD 14, and which would correlate the extension number with the directory number (e.g., mobile directory number) of the WCD 14. As with the configuration data for more conventional IP PBX extensions (e.g. traditional enterprise telephone stations), the configuration data for WCD 14 may define service preferences, such as whether to forward calls to voice mail and the like. Thus, when IP PBX server 50 is faced with a request to set up a call to or from WCD 14, IP PBX server 50 can apply those service preferences or other logic as it would for a call being placed to or from any other one of its extensions.

The configuration data for WCD 14 may also correlate the extension of WCD 14 with another extension on IP PBX server 50. For instance, if an enterprise user normally uses a particular desk phone when at work (on the enterprise network) but uses WCD 14 when on the road, the configuration data for WCD 14 can correlate the extension of WCD 14 with the extension of the user's desk phone. That way, when IP PBX server 50 is faced with a request to set up a call to or from WCD 14, IP PBX server 50 can programmatically set up the call to both WCD 14 and the user's desk phone extension, either simultaneously ringing both phones (and connecting with the one that answers first) or sequentially ringing both phones.

The configuration data for WCD 14 will be marked or have a characteristic of some kind that indicates IP PBX server 50 should handle calls for WCD 14 in a special way. For instance, the configuration data could be flagged (e.g., by the mere existence of a mobile directory number in the configuration data) to indicate that the WCD 14 is a WCD, and could indicate a network address of the CSCF 76 to which call setup signaling can be sent for WCD 14. (This can advantageously allow a given IP PBX server to extend its service to WCDs served by more than one wireless carrier, or through more than one media gateway system.)

Thus, for instance, when the IP PBX server 50 is faced with a request to connect a call to WCD 14, the IP PBX server 50 may determine based on the WCD's configuration data that the IP PBX server 50 should simultaneously set up the call to both the WCD 14 (via media gateway system 74 and RAN 12) and to the WCD user's desk phone on the enterprise network. As another example, when the IP PBX server 50 is faced with a request to connect a call from the WCD 14, the IP PBX server 50 may determine based on the WCD's configuration data how to handle the call and may handle the call accordingly.

A provisioning system may be in place to centrally configure HLR 34, SCP 32, HSS 82, CSCF 76, and IP PBX server 50 (as well as any other desired entities) with service settings to facilitate operation of the invention. The provisioning system can include a computer server (such as an "Actiview" server) that sits on the carrier's core network and that is programmed to communicate directly or through one or more other service provisioning interfaces (e.g., service management systems, enhanced service managers, etc.) with the various entities to be provisioned. In a preferred embodiment, the provisioning server would engage in industry standard CORBA signaling to convey provisioning updates to the various entities. Further, the administrator terminal 72 or another user terminal can be communicatively linked with the provisioning system (e.g., through a web interface) so as to allow an administrator or other user to configure IP PBX services for WCD 14.

The exemplary arrangement generally depicted in FIGS. 3 and 4 can be expanded to support multiple IP PBX servers, so that multiple IP PBX systems can serve cellular WCDs via a common cellular carrier. To accomplish this in a preferred embodiment, profile data in HSS 82 or elsewhere can correlate each of a plurality of WCDs with a respective IP PBX server that serves the WCD (i.e., the IP PBX server on which the WCD is an extension). When the CSCF 76 or another entity (such as one of the policy servers 84) is faced with a request to set up a call to or from a given WCD, the CSCF or other entity may then programmatically reference the correlation data to determine which IP PBX server serves that WCD, and the CSCF or other entity may then engage in signaling with that IP PBX server in order to set up the call to or through the IP PBX server.

Figure 5:
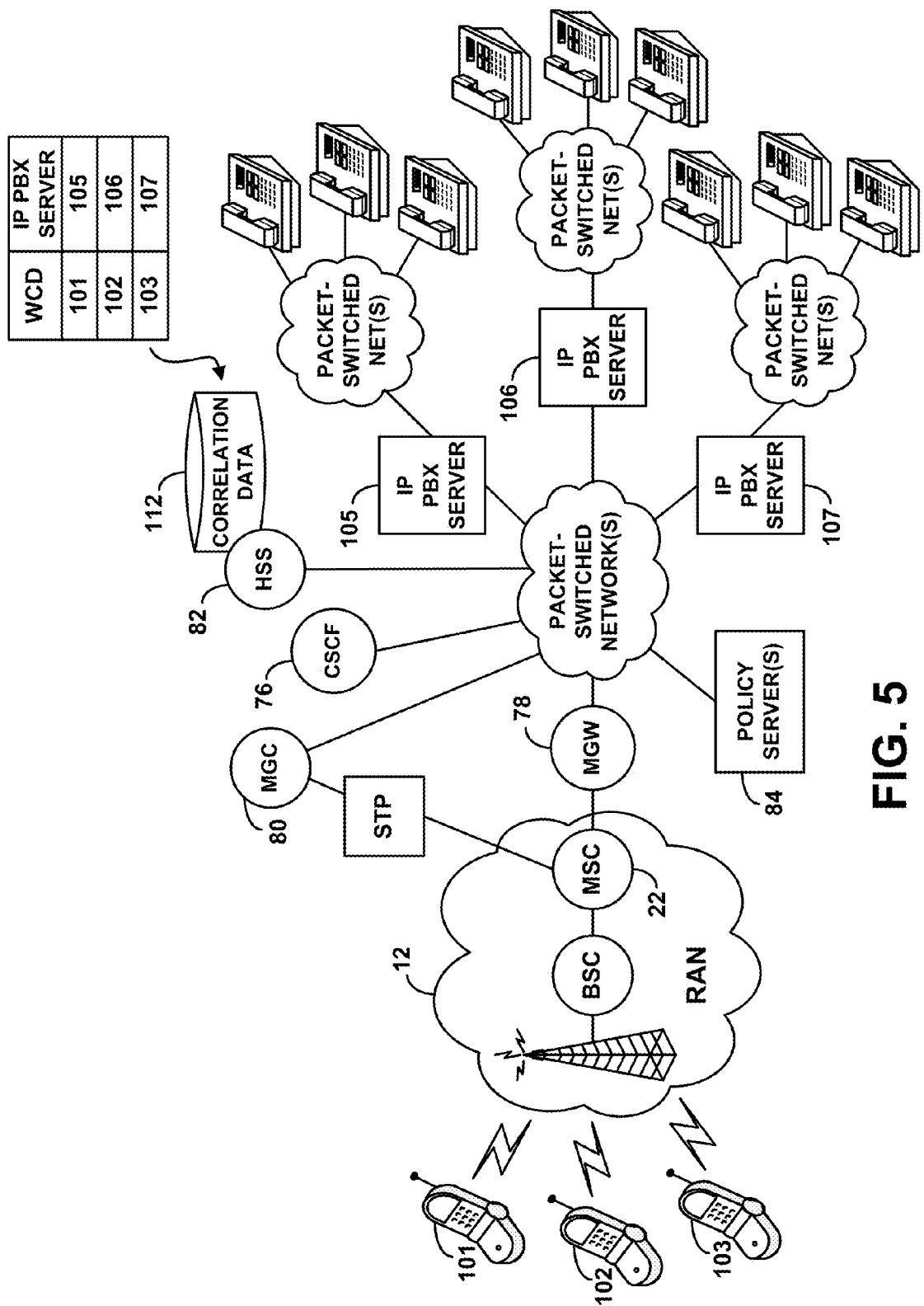
FIG. 5 is a block diagram depicting cellular-PBX integration set to support multiple IP PBX servers.

FIG. 5 depicts an example arrangement for carrying out this function. As shown, the example arrangement includes several WCDs 101, 102, 103 and several IP PBX servers 105, 106, 107, with all of the IP PBX servers being coupled with a packet-data network that provides connectivity with CSCF 76, MGW 78, MGC 80, HSS 82, and policy servers 84. Each IP PBX server, in turn, is shown coupled by a packet-data network with a plurality of enterprise telephone stations. For instance, each IP PBX server may reside on a respective enterprise network, and each enterprise network may have its own respective set of enterprise telephone stations that are extensions on its IP PBX server. Alternatively, each IP PBX server may reside in a carrier's core network and can function as a host IP PBX server for one or more enterprise networks, coupled by packet-data links with the enterprise networks that they serve. Still alternatively, some of the IP PBX servers may reside on enterprise networks and others may be host IP PBX servers that reside on a carrier's network or elsewhere.

As further shown in FIG. 5, HSS 82 includes or has access to correlation data 112, which correlates WCDs with IP PBX servers. As shown, for instance, the correlation data may take the form of a table of data, in which each record has a WCD identifier field and an IP PBX server identifier field. Each WCD identifier can be a WCD directory number (telephone number), a WCD serial number (e.g., ESN), a SIP address, a network access identifier, or some other identifier. Each IP PBX serer identifier can be a domain name, a SIP address, an IP address, a network access identifier, or some other identifier that can be used as a basis to route IP-based call setup signaling messages to the IP PBX server. In a preferred embodiment, this data would be provisioned in HSS 82 by a provisioning system such as that described above.

Thus, for instance, when CSCF 76 receives a signaling message seeking to set up an call placed to or from WCD 101, CSCF 76 may dip into HSS 82 and determine by reference to correlation data 112 that IP PBX server 105 serves the WCD, and so CSCF 76 may set up the call to IP PBX server 105 for handling. On the other hand, when CSCF 76 receives a request from MSC 22 seeking to set up a call placed to or from WCD 102, CSCF 76 may dip into HSS 82 and determine by reference to correlation data 112 that IP PBX server 106 serves the WCD, and so CSCF 76 may set up the call to IP PBX server 106 for handling.

Alternatively but similarly, when a policy server such as the PE policy server 94 receives a signaling message from CSCF 76 indicative of a request to set up a call to or from WCD 101, the policy server may dip into HSS 82 and determine by reference to correlation data 112 that IP PBX server 105 serves the WCD, and the policy server may responsively provide CSCF 76 with a domain name of IP PBX server 105. CSCF 76 may then set up the call to IP PBX server 105 for handling. And on the other hand, when the policy server receives a signaling message from CSCF 76 indicative of a request to set up a call to or from WCD 102, the policy server may dip into HSS 82 and determine by reference to correlation data 112 that IP PBX server 106 serves the WCD. The policy server may therefore provide the CSCF with the domain name of IP PBX server 106, and the CSCF may set up the call to that IP PBX server for handling.

3. Example Basic Call Setup Signaling with Cellular-PBX Integration

Advantageously, while WCD 14 is being served by the cellular carrier's RAN 12, WCD 14 can function as an extension of IP PBX server 50, so as to benefit from many or all of the same IP PBX services that enterprise telephone stations 54, 56, 58 enjoy. Consequently, the enterprise can extend its off the shelf IP PBX system to serve not only traditional IP PBX telephone stations but also mobile WCDs such as WCD 14.

The following subsections describe various functions that can be carried out in this manner, with reference to the network architecture of FIGS. 3 and 4. It should be understood, however, that many variations from these functions are possible as well.

a. Originating Inside Calls

In a first scenario, assume that WCD 14 places a call to another extension on the enterprise network, by dialing the extension number. To dial an extension number from a conventional cellular WCD (e.g., cell phone), a user would enter the extension number and press "SEND" or another key. An origination message will then pass over an air interface from WCD 14 to MSC 22 in the carrier's RAN 12, providing the RAN with (i) the WCD's mobile directory number (MDN) and electronic serial number (ESN) or one or more other identifiers, and (ii) the dialed digits, which, in this case, would be the dialed PBX extension rather than a full directory number.

Upon receipt and processing of the origination message, the MSC may then encounter a WIN trigger that points to the SCP. Thus, the MSC would send an IS-41 "Origination Request" (ORREQ) message via the signaling network to SCP 32, providing the SCP with the calling and called numbers. SCP 32 may then refer to a subscriber profile store to determine that the WCD originating the call subscribes to cellular-PBX integration service. Thus, the SCP will send an Origination Request return result (orreq_rr) to MSC 22, providing the MSC with the routing number of MGC 80, so as to cause MSC 22 to set up the call to the media gateway system.

MSC 22 would then send an ISUP IAM call setup message via the signaling network to MGC 80, providing the MGC with the calling and called numbers, and indicating that the call is a WCD-originated call. (Existing call signaling protocols define a parameter that can be used to indicate whether a call is a WCD-originated call (a call from a WCD) or a WCD-terminated call (a call to a WCD), for purposes of allowing a call processing entity to determine which party's profile to reference when setting up the call.) MGC 80 may then generate and send to CSCF 76 a corresponding SIP INVITE message that specifies the called extension as a telephone number URI in the "To" field, and that includes a header parameter indicating this is a WCD-originated call.

In this instance, given that the call is WCD-originated, the CSCF 74 may then dip into the correlation data 112 of HSS 82 to determine which host IP PBX server serves the originating cellular WCD (e.g., based on its MDN) and may obtain from correlation data 112 a domain name of the serving IP PBX server, such as IP PBX server 50. CSCF 76 may then responsively query DNS server 92 to resolve the domain name into an IP address of IP PBX server 50, and CSCF 76 may route the INVITE to that IP address.

SIP signaling may then proceed between the MGC 80 and IP PBX server 50, via the CSCF 76, to set up a voice/RTP call leg between MGW 78 and IP PBX server 50. At the same time, ISUP signaling would pass between MGC 80 and MSC 22 to set up a circuit-switched (e.g., PCM) call leg between MSC 22 and the MGW 78.

At this point, IP PBX server 50 has thus received a signaling message seeking to set up a call from WCD 14 to another IP PBX extension. Further, the IP PBX server 50 has a communication bearer path with WCD 14, via the RTP leg, MGW 78, the circuit leg, MSC 22, and cellular air interface 18. Thus, the IP PBX server 50 can apply the enterprise dial plan and thereby determine that this is a call to one of the enterprise IP PBX extensions.

In response to the determination that this is a call to an enterprise IP PBX extension, the IP PBX server 50 may then set up the call with SIP and RTP to the enterprise telephone station having that extension. For instance, if the IP PBX server 50 sits on the enterprise network, the IP PBX server 50 may engage in SIP communication with the called station to set up an RTP call path between the IP PBX server 50 and the called station. Or if the IP PBX server 50 sits outside of the enterprise network, on the carrier's core network for instance, the IP PBX server can similarly engage in SIP communication with the called station, via a packet-data link with the enterprise network, and via the enterprise network, to set up an RTP call path between the IP PBX server 50 and the called station.

Upon successful connection of the call between WCD 14 and the called enterprise IP PBX extension, both the signaling and bearer paths would flow through the IP PBX server 50. Thus, the IP PBX server 50 can conveniently manage the call, providing IP PBX features such as call transfer, conference calling, and the like for WCD 14.

On the other hand, if the IP PBX server 50 determines for some reason (such as based on the enterprise dialing plan or the WCD's configuration data) that the call cannot be connected through to the called party, the IP PBX server 50 (or its associated media server) could play a speech or tone announcement to the caller, via the established bearer path.

b. Originating Outside Calls

In the next scenario, assume that WCD 14 places a call to a PSTN phone number, i.e., to a full PSTN number rather than an IP PBX extension, such as the phone number of telephone 30 for instance. (The PSTN number could be a DID number in the enterprise, but that does not matter.) This scenario is largely the same as the scenario described above, up until the point where a call path (or associated signaling) is established to the IP PBX system, e.g., to the IP PBX server 50, except that the dialed digits represent a full directory number rather than an abbreviated PBX extension.

In the preferred embodiment, once the IP PBX server 50 receives the call setup request, the IP PBX server 50 may analyze the request and thereby determine that it is a call to a PSTN number. (For instance, the fact that the dialed digits are the length or other form of a full directory number rather than the length or form of a simple extension number may indicate that the call is a call to a PSTN number rather than to an IP PBX extension.) In response, the IP PBX server 50 may then set up the call via a PSTN gateway. For instance, the IP PBX server 50 may engage in SIP signaling with MGC 80 to set up an RTP call leg between the IP PBX server 50 and another MGW 110 tied to the PSTN 24, and MGC 80 may correspondingly engage in SS7 ISUP signaling (e.g., via STP 26, with SP 28) to set up the call from that MGW 110 via the PSTN 24 to the dialed number (telephone 30). (Alternatively, IP PBX sever 50 could set up the call to the outside number via a local telephone company switch.)

Advantageously, the call could thus proceed between WCD 14 and the called PSTN number, similarly leaving both signaling and bearer paths through the IP PBX server 50. The IP PBX server 50 could thus manage the outside call, to similarly provide IP PBX services, such as call transfer, conference calling, and the like.

c. Terminating Outside Calls

In this next scenario, assume that MSC 22 receives a request to connect an outside call (i.e., a call from a PSTN directory number) to WCD 14. For instance, MSC 22 may receive an ISUP IAM request from another switching point (e.g., SP 28) in the PSTN 24, seeking to set up a call to the directory number of WCD 14. (The call could come as a PSTN call from an outside line on the enterprise IP PBX system, but that does not matter.)

Upon receipt of the call setup message, the MSC may then encounter a WIN trigger that points to SCP 32. Thus, MSC 22 may send an IS-41 "AnalyzedInfo" message via the signaling network to the SCP, providing the SCP with the calling and called numbers. SCP 32 may then refer to a subscriber profile store to determine that the WCD being called subscribes to IP PBX service. Thus, SCP 32 may send an AnalyzedInfo return result to MSC 22, providing the MSC with the routing number of MGC 80, to cause MSC 22 to set up the call to the media gateway system.

MSC 22 may then send an ISUP IAM call setup message via STP 26 to MGC 80, providing MGC 80 with the calling and called numbers, and indicating that the call is a WCD-terminated call. MGC 80 may then generate and send to CSCF 76 a corresponding SIP INVITE message that specifies the called number (namely, the WCD's number) as a telephone number URI in the "To" field, and includes a header parameter indicating that this is a WCD-terminated call.

In this instance, given that the call is WCD-terminated, the CSCF 76 may then dip into the correlation data 112 of HSS 82 to determine which host IP PBX server serves the terminating cellular WCD (e.g., based on its MDN) and may obtain from correlation data 112 a domain name of serving IP PBX server, such as IP PBX server 50. CSCF 76 may then responsively query DNS server 92 to resolve the domain name into an IP address of IP PBX server 40, and CSCF 74 may route the INVITE to that IP address.

SIP signaling may then proceed between the MGC 80 and IP PBX server 50, via the CSCF 76, to set up a voice/RTP call leg between MGW 78 and IP PBX server 50. At the same time, ISUP signaling would pass between MGC 80 and MSC 22 to set up a circuit-switched (e.g., PCM) call leg between MSC 22 and the MGW 78.

At this point, the IP PBX server 50 has thus received a signaling message seeking to set up a call to WCD 14. Further, the IP PBX server 50 has a communication bearer path with WCD 14, via the RTP leg, MGW 78, the circuit leg, MSC 22, and cellular air interface 18. Thus, the IP PBX server 50 can apply the enterprise dial plan to determine how to handle the call.

Possible options for handling the call might include (i) ringing the WCD 14, (ii) simultaneously or sequentially ringing the WCD 14 and a corresponding desk phone extension at the enterprise, or (iii) sending the call to the WCD's voice mail box at the enterprise IP PBX (or on the enterprise network). General logic, or configuration data for WCD 14, for instance, may indicate which of these or other options the IP PBX server 50 should take. In an exemplary embodiment, for instance, IP PBX server 50 might first ring WCD 14 and then, if no one answers, send the call to voice mail or ring another enterprise extension. These various options are discussed in the following subsections.

i. Ringing the Cellular WCD

When the IP PBX server 50 decides to connect a call to the WCD 14, the IP PBX server 50 may effectively initiate an outbound call (call leg) to the WCD 14, via the media gateway system 74 and the RAN 12. To do so, the IP PBX server 50 could engage in SIP signaling with MGC 80, via the CSCF 76. For instance, the IP PBX server 50 could send a SIP INVITE that seeks to set up a call to the directory number of WCD 14 (which was indicated in the call setup message that the IP PBX server 50 had received from the MGC 80. At that point, one of two processes (among various others) could be applied.

In one process, MGC 80 could send an ISUP IAM to the WCD's home MSC. (Routing logic maintained or accessible by the MGC can correlate the directory number of WCD 14 with the home MSC.) In the exemplary embodiment, the MGC would include in the IAM an indication that this is the second leg of the call, or some other indication that the call has already been routed to the IP PBX system for handling, so as to avoid endless looping. The indication could be a user definable parameter in the IAM message, provided that the home MSC (or SCP, if queried by the home MSC) is programmed to interpret the parameter value as the indication. Upon receipt of the IAM, the home MSC would then encounter a WIN trigger that would cause the home MSC to send an IS-41 "LocationRequest" (LOCREQ) message to the WCD's HLR 34. And the HLR 34 then would return to the home MSC a LocationRequest return result (locreq_rr) that provides Advanced Termination Trigger directing the home MSC to send an AnalyzedInfo message to the SCP 32.

The home MSC would then send an AnalyzedInfo message to the SCP 32, with an indication that this is a second leg of a call (based on the indication it received from MGC 80). Due to that indication, the SCP 32 would send a "Continue" return result to the home MSC. And the home MSC would then send another LOCREQ to the HLR to find out where the called cellular WCD is currently located. Preferably, this second LOCREQ would include a trigger value that indicates this is a second LOCREQ and that the WCD location is to be determined, to preclude the HLR 34 from again providing an Advanced Termination Trigger.

If WCD 14 is in the home MSC's serving system (i.e., if MSC 22 is the home MSC), then the HLR would return a locreq_rr providing a "Local Delivery" result, and so the MSC 22 would page/ring the cellular WCD and, if someone answers, connect the call through to the cellular WCD. Alternatively, if the WCD is in another MSC's serving system (i.e., if MSC 22 is not the home MSC), then the HLR would send a RouteRequest (ROUTEREQ) to the serving MSC 22 and the MSC 22 would return a RouteRequest return result (routereq_a) providing a temporary local directory number (TLDN) to use for setting up the call to the cellular WCD. The HLR would then send a locreq_rr to the home MSC, providing the TLDN, and the home MSC would set up the call to the cellular WCD at that TLDN, i.e., via MSC 22.

In another process, instead of MGC 80 signaling to the WCD's home MSC and the home MSC 22 signaling to the HLR 34 to find out where WCD 14 is located, the MGC 80 could itself send a LOCREQ to the HLR 34 in an effort to get a TLDN to which the MGC 80 can route the outbound call to WCD 14.

A problem with doing this normally would be that, like the home MSC as described above, the MGC 80 would receive a locreq_rr that provides the MGC 80 with an Advanced Termination Trigger pointing to the SCP 32. To avoid this, MGC 80 could include in its LOCREQ to HLR 34 a parameter (or lack thereof) indicating that the MGC 80 is not WIN-trigger capable. As a result, HLR 34 would not return an Advanced Termination Trigger but would instead proceed to send a ROUTEREQ to the WCD's serving MSC 22 so as to obtain a TLDN for the WCD. And HLR 34 would then send the TLDN to MGC 80 in a locreq_rr. Given the TLDN, MGC 80 could then engage in ISUP signaling with the WCD's serving MSC 22, to set up the call to WCD 14 at that TLDN, i.e., via MSC 22.

(Another way for MGC 80 to avoid receiving an Advanced Termination Trigger from HLR 34 in response to a LOCREQ is for MGC 80 to indicate in the LOCREQ that it is WIN-trigger capable, but to provide a trigger-type of "location" rather than a trigger-type of "mobile termination." Given that the trigger-type is "location," HLR 34 would respond by providing a TLDN rather than providing an Advanced Termination Trigger.)

Once the call is connected to WCD 14, bearer and signaling paths would again remain through the IP PBX server 40. Thus, once again, the IP PBX server 40 could manage the call, providing IP PBX services, such as call transfer, conference calling, and the like.

ii. Ringing Another IP PBX Extension

When the IP PBX server 50 decides to ring another IP PBX extension, the IP PBX server can simply engage in SIP signaling to set up the call to the desired extension, in the manner described above for inside call originations. The IP PBX server 50 might do this after failing to connect the call to WCD 14. Alternatively, the IP PBX server 50 might do this at the same time as it seeks to connect the call to WCD 14, perhaps to simultaneously ring WCD 14 and the desk telephone of the WCD's user. In that case, the IP PBX server could connect the call through to whichever one answers the call first.

ii. Sending the Call to Voice Mail

If desired, the IP PBX server 50 could send the call to the WCD's voice mail box at the enterprise IP PBX system. To do so, the IP PBX server 50 could engage in SIP signaling with the enterprise voice mail server 60 or with another entity to connect the call to the enterprise voice mail server 60.

d. Terminating Inside Calls

Assume next that another extension of the enterprise IP PBX system dials the extension that the IP PBX system has assigned to WCD 14. When that happens, the IP PBX server 50 can determine how to handle the call. Possible handling options include, for instance, (i) ringing the cellular WCD, (ii) simultaneously or sequentially ringing the cellular WCD and a corresponding desk phone extension at the enterprise, or (iii) sending the call to the WCD's voice mail box at enterprise voice mail server 60. These options are discussed in the following subsections.

i. Ringing the Cellular WCD

To ring WCD 14, the IP PBX server 50 can engage in SIP signaling with MGC 80 (via the CSCF 76), and MGC 80 can engage in ISUP signaling with MSC 22, as described above. With additional response signaling, a call path could thus be set up from the IP PBX server 50 to the cellular WCD, via the media gateway system 74 and the RAN 12 serving the cellular WCD.

ii. Ringing Another IP PBX Extension

To ring another IP PBX extension, the IP PBX server 50 can apply its normal processes. The enterprise IP PBX server might do this after failing to connect the call to WCD 14. Alternatively, the enterprise IP PBX server might do this at the same time as it seeks to connect the call to WCD 14, perhaps to simultaneously ring the cellular WCD and the desk telephone of the cellular WCD's user. In that case, the enterprise IP PBX server could connect the call through to whichever one answers the call first.

iii. Sending the Call to Voice Mail

Similarly, if the IP PBX server decides to connect the call through to voice mail, the enterprise IP PBX can do so through its normal processes, such as engaging in SIP signaling to connect the call to the enterprise voice mail server.

4. Centralized Master IP PBX Server

With the widespread popularity of VoIP communication, many enterprises already have IP PBX servers in place to serve their users on their network. Advantageously, the present system can be applied to extend those existing IP PBX servers (or later acquired enterprise IP PBX servers) to serve users of cellular wireless devices as well.

One way to do so, as described above, is to provide a signaling and bearer path infrastructure between the enterprise IP PBX server and the cellular carrier's RAN, so the signaling and bearer path infrastructure can connect calls between the RAN and the IP PBX server, and the IP PBX server can thereby manage the calls in much the same way that the IP PBX server manages calls for the telephone stations on the enterprise LAN.

As presently contemplated, another way to do so is to provide a centralized host IP PBX server in the carrier's network and to operate the host IP PBX server as a "master" IP PBX server to handle calls for WCD extensions on the enterprise IP PBX system.

By way of example, the master IP PBX server could be the same make and model as the enterprise IP PBX server and could be configured largely (or fully) the same as the enterprise IP PBX server, so that the master IP PBX server can offer the same services as the enterprise IP PBX server. (A given master IP PBX server could be provisioned to serve multiple different enterprises, such as with partitioned logic and configurations for each enterprise for instance.)

More particularly, the master IP PBX server can be provisioned with configuration data for each WCD that is set as an extension on the enterprise IP PBX server (the slave IP PBX server), and the configuration data that the enterprise IP PBX server maintains for the WCD can direct the enterprise IP PBX server to turn to the master IP PBX server for call handling when faced with a request to handle a call to or from a WCD. Yet the enterprise IP PBX server itself can be set to fully manage calls involving non-WCD extensions, without the need to interact with the master IP PBX server.

In operation, the master IP PBX server can then engage in IP-based call setup signaling with the MGC 80, via the CSCF 76, to establish RTP communication between MGW 78 and the master IP PBX server. Further, the master IP PBX server can engage in both IP-based call setup signaling and RTP bearer communication with the enterprise IP PBX server, and the enterprise IP PBX server can in turn pass signaling and bearer data between the master IP PBX server and the enterprise telephone stations. (In an alternative embodiment, the enterprise IP PBX server can function as more than a mere conduit. For instance, it can apply some of its own logic to manage WCD calls as well.) Thus, the master IP PBX server would function as IP PBX server 50 in the description above, though its communications with enterprise telephone stations may pass through the applicable enterprise IP PBX server.

An advantage of this arrangement is that it allows the wireless carrier to better manage operation of the IP PBX system, such as to ensure that the IP PBX system and other entities (e.g., HLR, SCP, and media gateway system) are appropriately configured to facilitate serving WCD extensions on enterprise IP PBX system. Further, it can provide a centralized point (the master IP PBX server) with which various enterprise IP PBX servers can be set to communicate, rather than having IP PBX server be set to communicate with more likely many MGCs (distributed in various locations throughout a cellular carrier's network).

Figure 6:
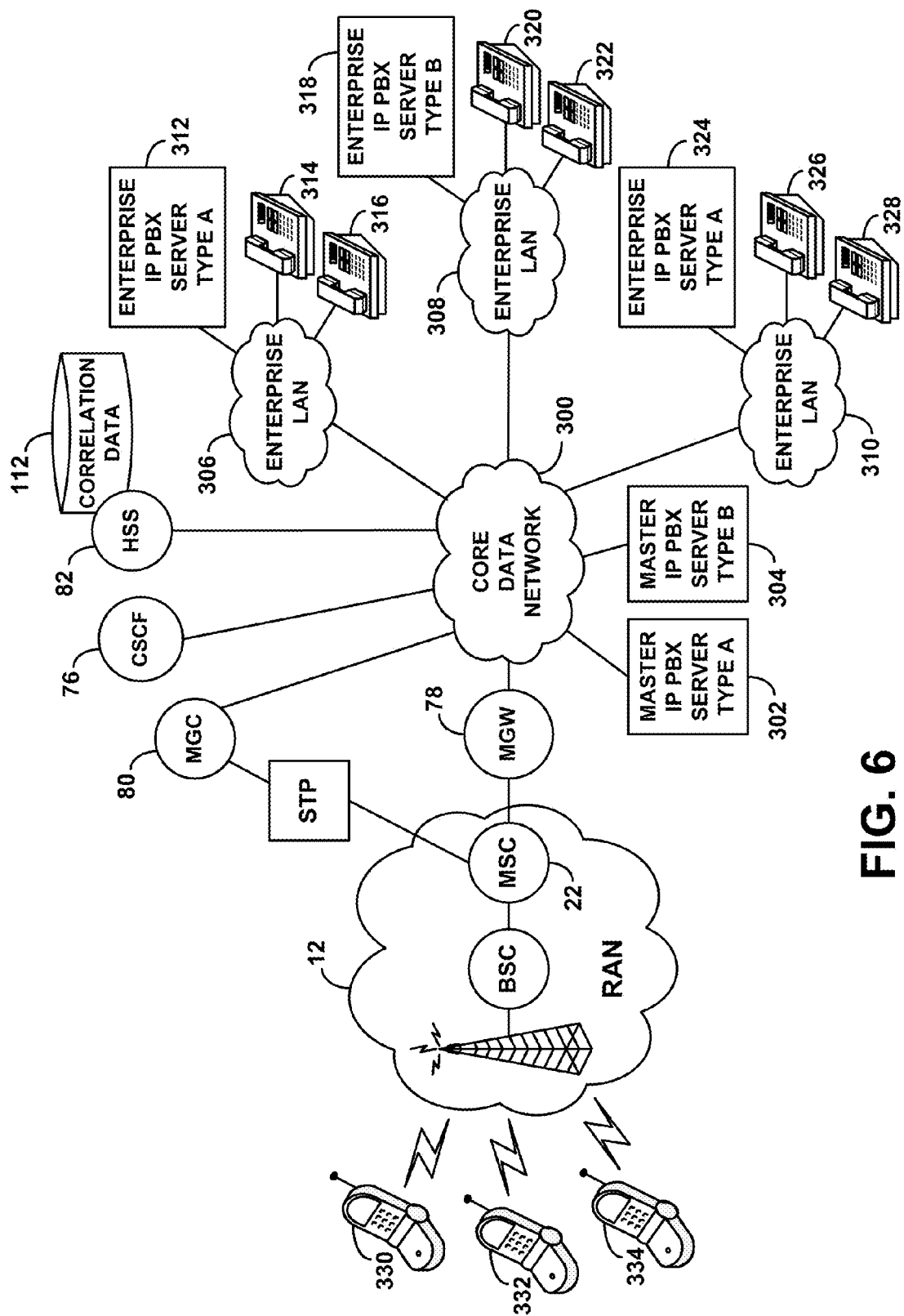
FIG. 6 is a block diagram depicting a master IP PBX server arrangement.

FIG. 6 depicts an example of this master IP PBX server arrangement. As shown in FIG. 6, MGC 80 and CSCF 76 are communicatively linked with a carrier's core packet data network 300. Further sitting as other nodes on network 300 are two representative master IP PBX servers 302, 304. Master IP PBX server 302 is an IP PBX server of "Type A," and master IP PBX server 304 is an IP PBX server of "Type B." Types A and B could be particular makes and models or particular configurations, for instance. By way of example, Type A could be an Avaya S8700 IP PBX server for instance, whereas Type B could be some other make and model IP PBX server.

Network 300 is then coupled with a plurality of enterprise networks 306, 308, 310. Further, sitting as a node on each enterprise network is a respective enterprise IP PBX server as well as a number of representative enterprise IP PBX telephone stations. In particular, sitting as nodes on enterprise network 306 are an enterprise IP PBX server 312 and representative enterprise telephone stations 314, 316; sitting as nodes on enterprise network 308 are an enterprise IP PBX server 318 and representative enterprise telephone stations 320, 322; and sitting as nodes on enterprise network 310 are an enterprise IP PBX server 324 and representative enterprise telephone stations 326, 328. As further shown by way of example, IP PBX servers 312 and 324 (on enterprise networks 306, 310) are of Type A, and IP PBX server 318 (on enterprise network 308) is of Type B.

FIG. 6 also depicts three representative WCDs 330, 332, 334, each of which may be set as extensions on one of the various enterprise IP PBX systems illustrated. For each WCD, the corresponding master IP PBX server (of the same type as the enterprise IP PBX server that serves the WCD) may thus have configuration data for the WCD, largely the same as the enterprise IP PBX server would be configured for the WCD if the master IP PBX server did not exist. For instance, WCD 330 may be set as an extension on enterprise IP PBX server 312, and master IP PBX server 302 (of the same type as enterprise IP PBX server 312) may include configuration data for WCD 330; WCD 332 may be set as an extension on enterprise IP PBX server 318, and master IP PBX server 304 (of the same type as enterprise IP PBX server 318) may include configuration data for WCD 332; and WCD 334 may be set as an extension on enterprise IP PBX server 324, and master IP PBX server 302 (of the same type as enterprise IP PBX server 324) may include configuration data for WCD 334.

With this arrangement, for example, when MGC 80 receives a request from MSC 22 to set up a call to or from WCD 330, MGC 80 may signal to CSCF 76, and CSCF 76 may dip into HSS 82 and reference correlation data 112 to thereby determine that master IP PBX server 302 serves the WCD. (In one embodiment, for instance, the correlation data may associate WCD 330 with enterprise IP PBX server 312 and may then associate IP PBX server 312 with master IP PBX server 302.) CSCF 76 may thus pass the calls setup signaling message to master IP PBX server 302. Master IP PBX server 302 may then apply the enterprise PBX dialing plan (corresponding to enterprise IP PBX server 312) and the configuration data of WCD 330 to determine how to handle the call. In the event master IP PBX server 302 determines that the call should be connected in turn to an extension on the enterprise network 306, master IP PBX server 302 may then set up the call through enterprise IP PBX server 312 to that extension.

As another example, when MGC 80 receives a request from MSC 22 to set up a call to or from WCD 332, MGC 80 may signal to CSCF 76, and CSCF 76 may dip into HSS 82 and reference correlation data 112 to thereby determine that master IP PBX server 304 serves the WCD. MGC 74 may thus engage in call setup signaling to set up the call with master IP PBX server 304. Master IP PBX server 304 may then apply the enterprise PBX dialing plan (corresponding to enterprise IP PBX server 318) and the configuration data of WCD 332 to determine how to handle the call. In the event master IP PBX server 304 determines that the call should be connected in turn to an extension on the enterprise network 308, master IP PBX server 304 may then set up the call through enterprise IP PBX server 318 to that extension.

5. IP Centrex as Hosted IP PBX

In yet another embodiment, the functionality of an enterprise IP PBX server can be provided entirely by a telecommunications carrier or other entity, such as a wireless carrier for instance, with or without an IP PBX server being situated at the enterprise as well. More particularly, the IP PBX server can take the form of an IP Centrex server that sits on a carrier's packet network and that is connected through one or more routers or gateways with the enterprise network.

With this arrangement, packet-based call setup signaling can flow between the enterprise network and the IP Centrex server, to allow the IP Centrex server to set up inside calls within the enterprise as well as outside calls to or from the enterprise, just as another sort of IP PBX server would do. Further advantageously, like the hosted IP PBX server described above, an IP Centrex server can be arranged to serve multiple different enterprises, with partitioned logic for instance.

6. Selective Check-In/Check-Out Logic

As noted above, the integration of cellular telephone service with IP PBX service can provide a significant benefit, in that it allows a user to enjoy IP PBX service features when the user is out of the office and operating a cellular telephone, theoretically anywhere within the coverage provided by the user's wireless carrier. By the same token, however, there may be times when a user who subscribes to such service does not want the service to apply. For instance, during evenings and weekends, the user may want his or her cell phone to function as a personal cell phone, not tied to the user's work IP PBX system, but during weekdays when the user is out of the office, the user may want his cell phone to function as an IP PBX extension.

To account for this desire, logic can be added to enable a WCD user to "check in" and "check out" of the cellular-PBX integration service, such as by allowing the user to activate and deactivate the service or to have a defined schedule that indicates when the service should apply and when it should not apply. Such logic can be implemented in various ways within the example system described above. Two example implementations are described in the following subsections.

a. Personal-Enterprise Policy Server

According to a first embodiment, HSS 82 will maintain in the WCD's profile an indication of whether the WCD is currently checked-into or checked-out of the system. The indication may be a Boolean flag that a user can set or clear to indicate whether the cellular-PBX integration function should apply or not. When the flag is set, the WCD would be treated as an extension of the IP PBX system, such as in the manner described above. And when the flag is cleared, the WCD would be treated as a conventional WCD, allowing personal cellular service without cellular-PBX integration. Alternatively, the indication in the WCD's profile may take the form of a schedule that indicates specific times (e.g., times of day, days of week, dates, etc.) when the cellular-PBX integration function should apply and other times when it should not apply.

Preferably, the user will provision the settings in the profile by interacting with a web based provisioning interface provided by a web server tied to the HSS. For instance, the user may employ a generic web browser on the user's WCD or personal computer to browse to an address of the web server and, after being authenticated, may receive a report of the current profile settings and make changes to the profile settings. As the user thereby checks-in or checks-out (e.g., by setting or clearing a Boolean flag) or changes a check-in/check-out schedule, the web server would then preferably populate or update the WCD's profile in HSS 82 accordingly (e.g., by writing directly to the profile, or by sending a signal to another entity to update the profile).

This check-in/check-out process can change the example operation described above in various ways, a number of which are described in the following subsections. These example variations can be extended by analogy to other cellular-PBX integration functions as well. Further, it should be understood that the specific variations described below are set forth by way of example only and that numerous alternatives are possible.

i. Terminating Outside Calls

When a call is placed to the directory number of WCD 14, as described above, MSC 22 would receive a request to terminate the call and (as instructed by SCP 32, for instance) would responsively set up the call to media gateway system 74. In particular, MSC 22 would engage in ISUP signaling with MGC 80. In the process, MGC 80 would then send to CSCF 76 a SIP INVITE message that specifies in the "To" field the called telephone number, which is the directory number of the WCD.

In accordance with the exemplary embodiment, the CSCF 76 will then responsively dip into HSS 82 and thereby determine that the called number is assigned to an account that subscribes to cellular-PBX integration service. In response to the determination that the called WCD subscribes to cellular-PBX integration service, the CSCF 76 will programmatically route the INVITE or a corresponding message to PE policy server 94 to enable a determination of whether the WCD is currently checked-into or checked-out of the service.

To make this happen, the HSS profile for the WCD may specify a domain name for the PE policy server 94, such as "pe-policy.com", or CSCF 76 may be programmed with an indication of that domain name. The CSCF 76 may then append that domain name to the end of the telephone number URI in the "To" field of the SIP INVITE, so as to create a full SIP address in the form "+9876543210@pe-policy.com" To route that SIP INVITE, the CSCF 76 may then dip into the DNS server 92 to determine an IP address corresponding to that domain name and may then transmit the INVITE to that IP address, i.e., to the PE policy server 94.

Upon receipt, the PE policy server 94 will then programmatically analyze the called number and will itself dip into HSS 82 to determine whether the called WCD is currently checked-into or checked-out of the cellular-PBX integration function.

If the PE policy server 94 thereby determines that the called WCD is not checked into the system (i.e., is currently checked out of the system), the PE policy server 94 will then signal back to the CSCF 76 to cause the CSCF 76 to set up the call back to the media gateway system 74 for connection back to MSC 22 and to the WCD 14.

To do this in practice, the PE policy server 94 can insert in the SIP INVITE a predetermined code that will direct the CSCF 76 to set up the call back to the media gateway system 74, and may then send the INVITE back to the CSCF 76. In one embodiment, for instance, the predetermined code could be a sequence of five "9"s prepended to the called number in the "To" field, but it could take other forms and be set forth in some other manner in the INVITE, provided that the CSCF is programmed to detect the code and respond accordingly. Further, the PE policy server or the CSCF can strip the PE policy server domain from the "To" field of the INVITE message to direct call setup to the directory number of the WCD. Alternatively, the PE policy server 94 can change the URI in the "To" field to include a domain name of the MGC 80.

When CSCF 76 receives the INVITE and detects the predetermined code or domain, the CSCF will responsively send the INVITE or a corresponding message to MGC 80, seeking to set up the call to the directory number of WCD 14. The MGC 80 will then responsively engage in ISUP signaling with MSC 22 to set up the call to the WCD.

On the other hand, if the PE policy server 94 determines that the called WCD is currently checked into the cellular-PBX integration service, the PE policy server 94 will then signal back to the CSCF 76 to cause the CSCF 76 to set up the call to IP PBX server 50. To do this in practice, the PE policy server 94 may determine from the WCD's HSS profile a domain name of the IP PBX server that serves the WCD, such as "ippbx50.com", and the PE policy server 94 may substitute that domain name in the "To" field of the SIP INVITE. The PE policy server 94 may then send that INVITE to the CSCF 76. To route the INVITE, the CSCF 76 may then dip into DNS server 92 to determine an IP address corresponding to that domain name and may then transmit the INVITE to that IP address, i.e., to IP PBX server 50. Processing can then continue as described above.

ii. Terminating Inside Calls

In accordance with the exemplary embodiment, when a call is placed to the WCD's assigned PBX extension, the IP PBX server 50 will programmatically send a SIP INVITE to the CSCF 76, to facilitate a determination of whether the WCD is currently checked-in or checked-out and to facilitate appropriate handling of the call. Preferably, the IP PBX server 50 will include as the called number in the "To" field of the SIP INVITE the 10-digit directory number of the WCD. Further, the IP PBX server 50 may include in the INVITE a predetermined code that will function as a programmatic directive to cause the CSCF to signal to PE policy server 94. For instance, the IP PBX server 50 can prepend five "8"s to the directory number, and the CSCF can be programmed to interpret the five "8"s as an indication that the CSCF should responsively signal to the PE policy server 94.

Upon receipt of the INVITE from the IP PBX server 50, the CSCF 76 will thus send the INVITE or a corresponding message to the PE policy server 94, preferably first stripping the prepended digits from the directory number. The PE policy server 94 will then analyze the called number and will dip into HSS 82 to determine if the called WCD is currently checked-into or checked-out of the cellular-PBX integration function.

If the PE policy server 94 thereby determines that the called WCD is not checked into the system, the PE policy server 94 will then signal back to the CSCF 76 to cause the CSCF 76 to set up the call back to the IP PBX server 50. For instance, the PE policy server 94 can include in the message a predefined code that the CSCF 76 would interpret as an instruction to not pass the call to the WCD. In this instance, the CSCF 76, which has a pending SIP INVITE from the IP PBX server 50, will preferably send a SIP response message to the IP PBX server 50, indicating that the call cannot be completed to the WCD. For example, the CSCF can send a SIP REDIRECT message, redirecting the call to the WCD's voice mail box, or the CSCF can send some other SIP "unavailable" message. The IP PBX server 50 can then operate as it normally does when a call cannot be completed.

On the other hand, if the PE policy server 94 determines that the WCD is currently checked into the system, then the PE policy server 94 will send a signal to the CSCF 76 that will cause the CSCF 76 to route the call to the media gateway system for connection in turn to MSC 22 and to the WCD 14.

One way to do this in practice is for the PE policy server 94 to remove the prepended "8"s from the called number and replace them with a sequence of five "9"s prepended to the called number, and then send the SIP INVITE to the CSCF 76. As above, when the CSCF 76 receives an INVITE that has the five "9"s prepended to the called number (or contains some other predetermined code), the CSCF 76 will responsively send the INVITE to MGC 80 (preferably after first stripping the prepended "9"s), to set up the call to the called number. Upon receipt of the INVITE, MGC 80 would then engage in ISUP signaling with MSC 22 to set up the call to the WCD.

iii. Originating Calls from the WCD

When WCD 14 initiates a call to a set of dialed digits, the process described above would apply to set up the call to media gateway system 74 and provide a SIP INVITE to CSCF 76. In particular, at the instruction of SCP 32, MSC 22 may set up the call to media gateway system 74, and MGC 80 may then send a SIP INVITE to CSCF 76. The INVITE would preferably include a predetermined code or other indication that the calling number, in the "From" field, is a WCD.

In response to the INVITE, the CSCF 76 will then responsively dip into HSS 82 and thereby determine that the calling number is assigned to an account that subscribes to cellular-PBX integration service. In response to the determination that the calling WCD subscribes to cellular-PBX integration service, the CSCF 76 will programmatically route the INVITE or a corresponding message to PE policy server 94 to enable a determination of whether the WCD is currently checked-into or checked-out of the service.

If the PE policy server 94 determines that the calling WCD is not checked into the system, the PE policy server 94 will responsively send a signal to the CSCF 76 to cause the CSCF 76 to set up the call back to the media gateway system 74. The PE policy server 94 can do this in the ways described above for instance, such as by changing the URI of the called party to include an MGC domain name, or by including in the INVITE a predetermined code that will direct the CSCF 76 to route the INVITE to the MGC 80. In either case, the MGC 80 will then set up the call back through MSC 22, to allow MSC 22 to handle the call conventionally, such as by attempting to connect the call through the PSTN to the called party.

On the other hand, if the PE policy server 94 determines that the calling WCD is checked into the system, then the PE policy server 94 will send a signal to the CSCF 76 to cause the CSCF 76 to route the call to the IP PBX server 50 for handling. In the manner described above, for instance, the PE policy server 94 can apply an IP PBX server domain name to the called URI in the "To" field, and the CSCF 76 can then dip into the DNS server 92 and route the INVITE to the corresponding IP address of IP PBX server 50. Processing can then continue as described above.

b. SCP as Policy Server

According to an alternative embodiment, SCP 32 (rather than, or in addition to, HSS) will maintain in the WCD's profile an indication of whether WCD is currently checked-into or checked-out of the system, and/or a schedule that indicates times when the WCD is checked-in and times when the WCD is checked-out. As with the HSS profile discussed above, a user will preferably provision this profile through a web-based interface. Alternatively, feature-codes (e.g., # or * codes) could be defined to allow the user to check-in and check-out of the service as recorded in the WCD's SCP-based profile record.

As an alternative, HSS 82 could maintain the profile record for the WCD as in the above embodiment, and SCP 32 could be programmed (or directed by WCD profile parameters) to dip into HSS 82 to determine whether the WCD is currently checked-in or checked-out. For this purpose, the SCP 32 could be provided with a packet-network connection, through which it can communicate with the HSS, such as by sending a remote procedure call or the like. Still alternatively, the SCP 32 and HSS 82 could be integrated together as a common network entity.

The following subsections discuss how this embodiment may operate to handle call origination from the WCD and call termination to the WCD.

i. Terminating Calls to the WCD

When MSC 22 receives a request to terminate a call to the WCD's directory number, the MSC will encounter an intelligent network trigger and will responsively signal to the SCP 32, sending an AnalyzedInfo message indicative of a call termination attempt. By reference to the WCD's profile record, the SCP will then determine whether the called WCD is currently checked-into or checked-out of the cellular-PBX integration service.

If the SCP determines that the WCD is not checked into the system, the SCP will signal back to the MSC, directing the MSC to conventionally handle the call termination, and the MSC will then do so. On the other hand, if the SCP determines that the WCD is checked into the system, then the SCP will signal back to the MSC, directing the MSC to set up the call to the media gateway system. The MSC will then do so, and processing will continue as described above for instance.

ii. Originating Calls from the WCD

When the MSC receives a request from the WCD to originate a call, the MSC will similarly encounter a trigger and responsively signal to the SCP, sending an Origination Request indicative of a call origination attempt. The SCP will then determine whether the calling WCD is currently checked-into or checked-out of the system.

If the SCP determines that the WCD is not checked into the system, the SCP will signal back to the MSC, directing the MSC to conventionally handle the call origination, and the MSC will then do so. On the other hand, if the SCP determines that the WCD is checked into the system, the SCP will signal back to the MSC, directing the MSC to set up the call to the media gateway system. The MSC will then do so, and processing will continue as described above for instance.

c. Using Other Party as Basis for Deciding Whether to Apply Cellular-PBX Integration As an alternative or additional embodiment, the identity of the party with whom the WCD is engaging in a call can be used as a basis to determine whether to apply cellular-PBX integration or not. In this regard, the WCD's profile (e.g., at HSS 82 and/or SCP 32) could include a listing of directory numbers and/or PBX extensions with respect to which cellular-PBX integration should be applied and/or a listing of directory numbers and/or PBX extensions with respect to which cellular-PBX integration should not apply.

When an entity such as PE policy server 94 or SCP 32 seeks to determine whether to apply cellular-PBX integration, the entity may then refer to the WCD's profile to determine whether the party with whom the call would be connected is one for which cellular-PBX integration should be applied. For instance, for an outgoing call from WCD 14, the decision could be based on the dialed digits, while, for an incoming call to WCD 14, the decision could be based on the telephone number or extension of the calling party.

By way of example, a WCD user may specify in his or her profile that calls to or from the user's spouse should be not be treated as cellular-PBX integration calls, so that the a call between the WCD's directory number and the spouses telephone number would not be routed through the IP PPX server 50. On the other hand, a WCD user may specify in his or her profile that calls to or from the user's work colleagues or boss should be treated as cellular-PBX integration calls, so that a call between the WCD and the boss's telephone number would be routed through the IP PBX server 50. Other examples are possible as well.

In this regard, the act of determining, based at least in part on the other party's identity, whether or not to apply cellular-PBX integration can be considered another manner of determining whether or not the WCD is "checked-in" or "checked-out" on a per-call basis. If the determination is to not apply cellular-PBX integration due in part to the identity of the other party, then the WCD can be considered "checked-out." Whereas, if the determination is to apply cellular-PBX integration due in part to the identity of the other party, then the WCD can be considered "checked-in."

c. Example Process Flow

Figure 7:
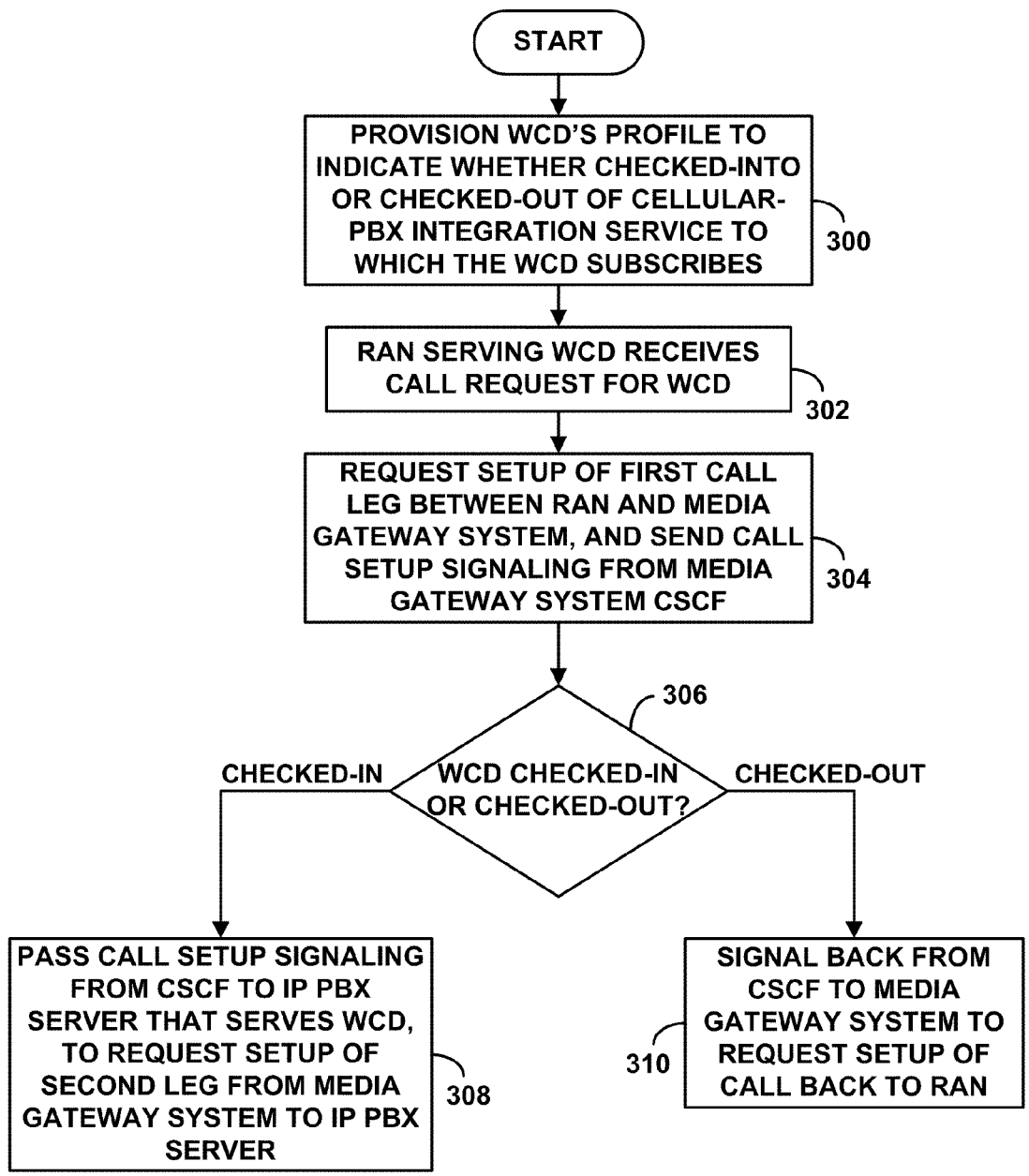
FIGS. 7-13 are flow charts depicting functions that can be carried in accordance with exemplary enhancements of cellular-PBX integration service.
Figure 8:
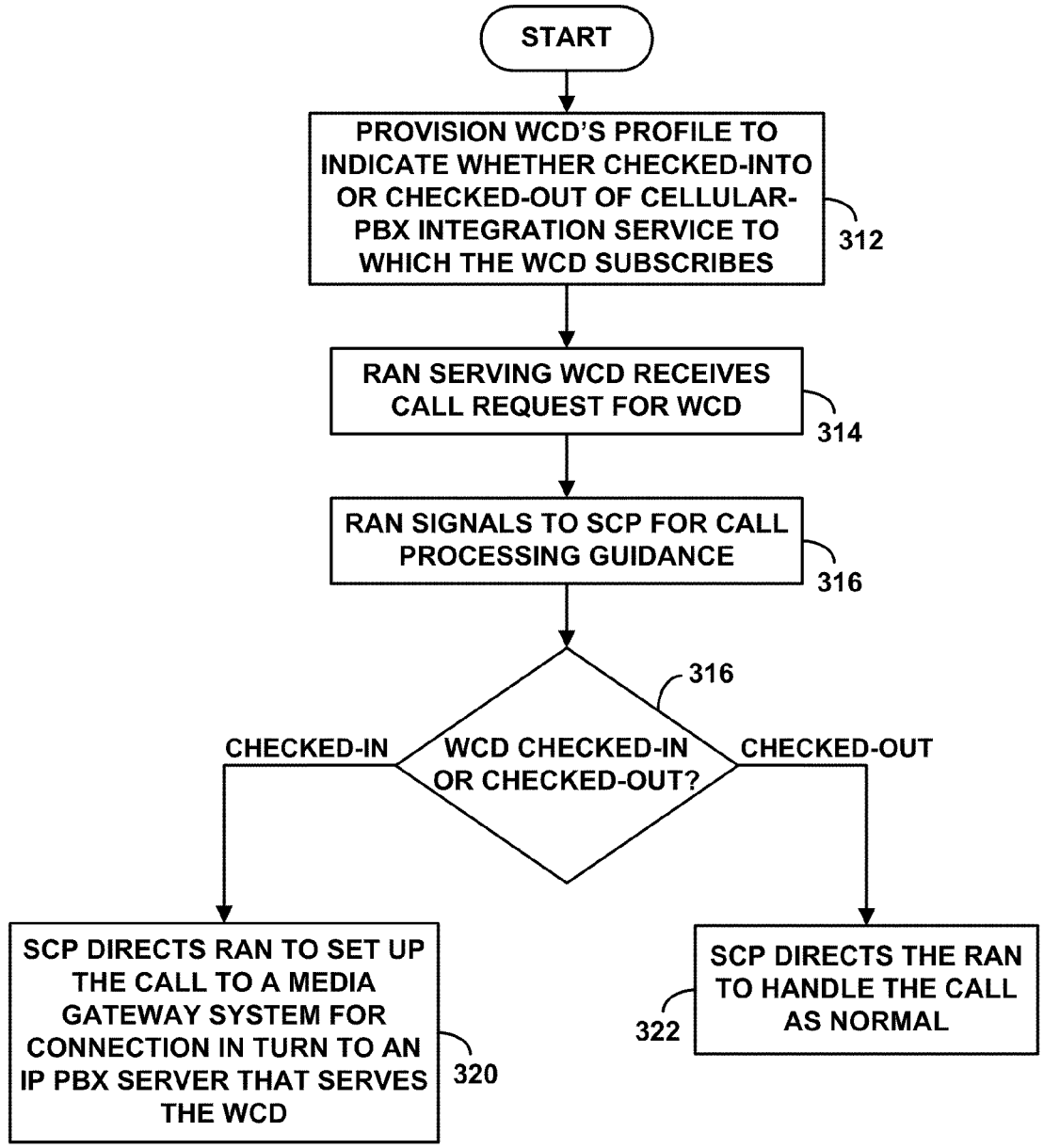

FIGS. 7 and 8 are flow charts depicting example sets of functions that can be carried out to provide selective check-in/check-out functionality.

As shown in FIG. 7, at step 300, a WCD's profile record is provisioned to indicate whether the WCD is checked-into or checked-out of a cellular-PBX integration service. At step 302, a RAN serving the WCD receives a call request for the WCD. At step 304, a first leg of the call is requested to be set up between the RAN and a media gateway system, and call setup signaling is sent from the media gateway system to a CSCF.

At step 306, a determination is made as to whether the WCD is currently checked-into or checked-out of the cellular-PBX integration service, such as by reference to the profile record. If the determination is that the WCD is checked-in, then, at step 308, the call setup signaling is passed from the CSCF to an IP PBX server that serves the WCD, to request set up of a second leg of the call from the media gateway system to the IP PBX server. On the other hand, if the determination is that the WCD is currently checked-out, then, at step 310, then signaling is passed back from the CSCF to the media gateway system to request setup of the call back from the media gateway system to the RAN.

As shown in FIG. 8, at step 312, a WCD's profile record is provisioned to indicate whether the WCD is checked-into or checked-out of a cellular-PBX integration service. At step 314, a RAN serving the WCD receives a call request for the WCD. At step 316, the RAN signals to an SCP for call processing guidance. At step 318, the SCP determines whether the WCD is currently checked-into or checked-out of the cellular-PBX integration service, such as by reference to the profile record. If the determination is that the WCD is checked-in, then, at step 320, the SCP directs the RAN to set up the call to a media gateway system for connection in turn to an IP PBX server that serves the WCD. On the other hand, if the determination is that the WCD is checked-out, then, at step 322, the SCP directs the RAN to handle the call as normal.

7. Selective Voice-Mail Routing

As illustrated in the figures and described above, voice mail service may be provided by both a cellular wireless carrier and an enterprise IP PBX system. For instance, as shown in FIG. 4, a voice mail server 86 provided by a cellular carrier may reside on packet-switched network 90, and the carrier's media gateway system 74 may be arranged to connect unanswered, blocked or busy calls to that voice mail server 86. Further, another voice mail server 60 may be provided on an enterprise network, and IP PBX server 50 may be arranged to connect unanswered, blocked or busy calls to that voice mail sever 60.

With cellular-PBX integration, the existence of separate cellular and enterprise voice mail systems raises an issue of which voice mail system to apply in a given instance. For instance, when the WCD user seeks to check the WCD's voice mail (such as by dialing the directory number of the WCD), at issue is whether the WCD should be connected to the WCD's voice mail box on the cellular voice mail system or rather to the WCD's voice mail box on the enterprise voice mail system. Similarly, when another party calls the WCD's directory number or the WCD's IP PBX extension and the call is unanswered, blocked, or busy, at issue is whether the caller should be connected to the WCD's cellular voice mail box or rather to the WCD's enterprise voice mail box.

One way to handle this issue, in accordance with the exemplary embodiment, is to introduce voice mail (VM) policy server 98 into the cellular-PBX integration system, as shown in FIG. 4, and to configure the system to invoke the VM policy server 98 when a need arises to select a destination voice mail box. For instance, when CSCF 76 is to route a call to the voice mail box of WCD 14, CSCF 76 may send a SIP signal to the VM policy server 98, and the VM policy server 98 may determine whether to connect the call to the WCD's cellular voice mail box or to the WCD's enterprise voice mail box. The VM policy server 98 may then signal back to the CSCF 76 in a manner that directs CSCF 76 to route the call to the selected voice mail box.

VM policy server 98 can decide in various ways which voice mail server should handle a given call. In one embodiment, for instance, VM policy server 98 can dip into HSS 82 and determine based on the WCD's profile which voice mail server to use. In this regard, the WCD's profile could specify voice mail systems to use depending on the calling party, the time of day, or other factors. Alternatively, the decision of which voice mail system to use can be keyed to whether the WCD is currently checked-into or checked-out of the system, such as by selecting the enterprise voice mail system if the WCD is checked-in and selecting the cellular voice mail system if the WCD is checked-out.

In an alternative embodiment, however, the VM policy server 98 will preferably include, embody, or be interconnected with an integrated voice response unit (IVRU), such as a voice-XML (VXML) based platform, as depicted in FIG. 4 for instance. The process of invoking the VM policy server 98 can then involve connecting the calling party to the IVRU. Once connected, the IVRU may then prompt the calling party to select a voice mail system for handling the call. In response to the caller's selection, the IVRU may then direct the CSCF 76 to redirect the call to the selected voice mail server.

Advantageously, this arrangement gives the caller more direct control over the voice mail routing decision for a given called WCD. In some instances, a caller may opt to have a call connected to the WCD's cellular voice mail box, and in other instances, a caller may opt to have a call to the same number connected instead to the WCD's enterprise voice mail box.

The following subsections discuss example functions that can be carried out in this manner, (a) when the WCD is to be connected to its own voice mail box and (b) when another party is to be connected to the WCD's voice mail box. As with the other embodiments described herein, many variations from the functions described are possible.

a. WCD Call to Voice Mail

In order for the WCD to connect with its own voice mail box, the WCD may dial its own directory number, so as to force a connection with voice mail. (Alternatively, a feature code or other mechanism could be defined to trigger a connection with voice mail. Generally, any call request to connect with voice mail can be considered a "voice mail call request.") When that happens, MSC 22 will engage in ISUP signaling with MGC 80 to set up the call to media gateway system 74 in the manner described above for instance. MGC 80 will then send a SIP INVITE for the call to CSCF 76, with the INVITE specifying the same number in both the calling ("From") and called ("To") fields.

Upon receipt of the INVITE, the CSCF 76 will then detect that the calling and called numbers are the same and will therefore conclude that the WCD is attempting to call itself. In response, the CSCF 76 will dip into the WCD's profile in HSS 82 to ascertain (i) the domain or IP address of the IVRU (VM policy server) 98, and (ii) descriptors and domain names or IP addresses of the voice mail servers that are available to handle the call, i.e., the voice mail servers that host voice mail boxes for the WCD.

The CSCF 76 will then forward the SIP INVITE or send a corresponding message to the IVRU (first dipping into DNS server 92 if necessary), and would provide within the SIP INVITE a directive for the IVRU to prompt the caller to select a voice mail system. By way of example, the CSCF 76 may include in one or more SIP header parameters in the INVITE a VXML script will cause the IVRU to play out a prompt such as "Press 1 for personal (cellular) voice mail, or press 2 for corporate (enterprise) voice mail," and that links each choice to a respective URL tying the WCD's number with a given voice mail server. Assuming the WCD's called number is 9876543210, for instance, choice 1 could be linked to the URL "+9876543210@cellular-vms.com" (for voice mail server 86) and choice 2 could be linked to the URL "+9876543210@enterprise-vms.com" (for voice mail server 60).

At that point, the IVRU may engage in continued SIP signaling (e.g., 200 OK/ACK) with the MGC 80, via the CSCF 76, so that a bearer path can be set up between the MGW 78 and the IVRU and thus ultimately between the calling WCD and the IVRU. Once connected, the IVRU will then play out the specified prompt to the calling WCD, and the IVRU will receive from the WCD a spoken or DTMF selection of the desired voice mail server.

Provided with the a selection of a desired voice mail server, the IVRU will then preferably send to the CSCF 76 a SIP REDIRECT message that may pass in turn to the MGC 80 (or stop wherever the SIP signaling initiated). The SIP REDIRECT will include as a redirect-URL the URL that was associated with the selected voice mail server, such as "+9876543210@cellular-vms.com" or "+9876543210@enterprise-vms.com". The MGC 80 (or other initiating SIP endpoint) would then send a SIP INVITE to the newly designated URL and engage in further SIP signaling to establish a bearer path between the caller and the selected voice mail server. Further, the telephone number in the URL would indicate to the voice mail server that the call is to be connected to the WCD's voice mail box.

If the selected voice mail server is the cellular voice mail server 86, then the SIP signaling would thus pass through network 90 between MGC 80 and voice mail server 86. On the other hand, if the selected voice mail server is the enterprise voice mail server 60, then the SIP signaling would pass through network 90 between MGC 80 and voice mail server 60. In a preferred embodiment, as shown in FIG. 4, enterprise voice mail server 60 will be tied directly to network 90 to facilitate this signaling and to enable a resulting bearer path to extend from MGW 78 to the enterprise voice mail server 60 without involving the IP PBX server 50. Alternatively, however, the signaling and bearer path to connect with enterprise voice mail server 60 could extend through IP PBX server 50, but precautions would be put in place to avoid an endless loop condition.

b. Third Party Call to WCD's Voice Mail

When a third party places a call to the WCD (either to the WCD's directory number or its IP PBX extension) and the call is unanswered, blocked, or busy, CSCF 76 will preferably receive a SIP message, such as a SIP BUSY, that indicates the call cannot be connected to the WCD. The same process described above for a WCD initiated call to voice mail will then apply, although the caller would be a third party rather than the WCD itself.

Thus, the CSCF 76 may dip into HSS 82, and send a signal to the IVRU of VM policy server 98, the IVRU would prompt the caller to select a voice mail server to handle the call, and the IVRU would then send a SIP REDIRECT or otherwise direct the call to be connected to the WCD's voice mail box on the selected voice mail server.

c. Example Process Flow

Figure 9:
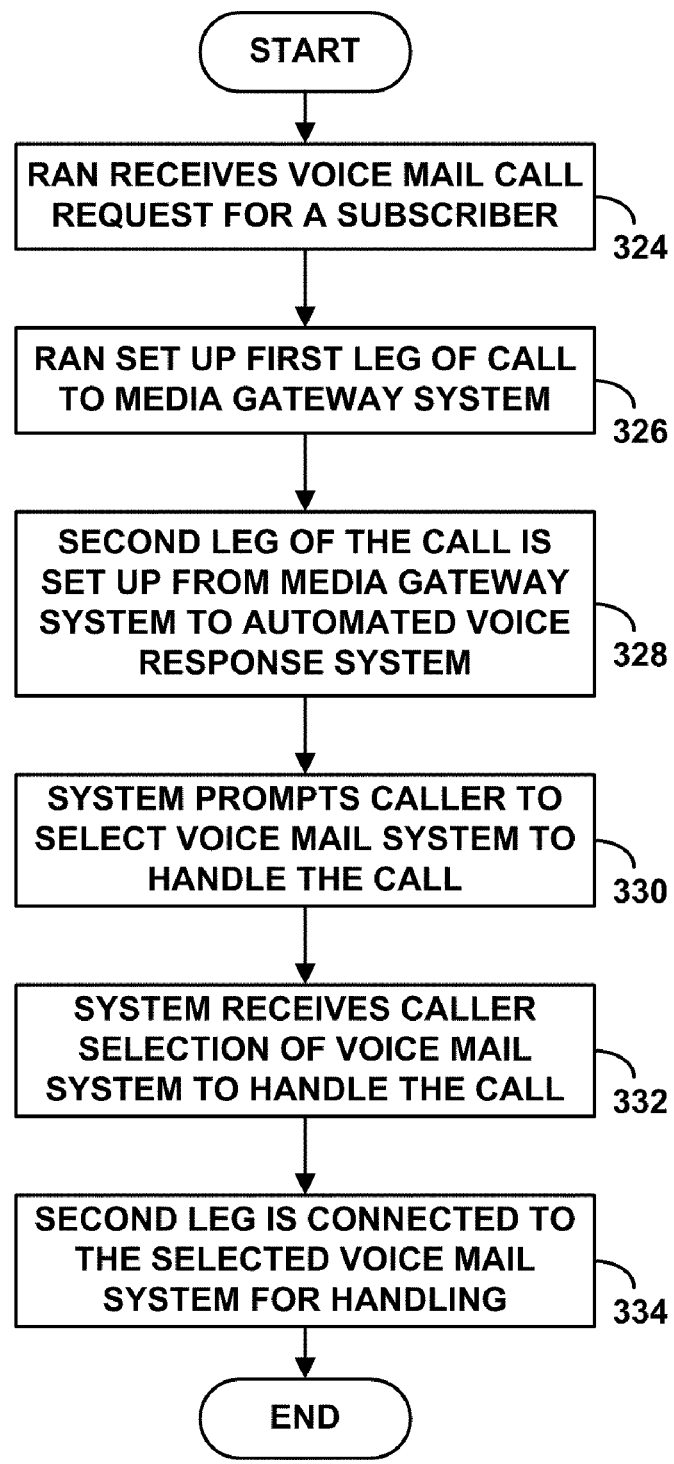

FIG. 9 is a flow chart depicting an example set of functions that can be carried out to provide dynamic voice mail routing. As shown in FIG. 9, at step 324, a RAN receives a voice mail call request for a subscriber (such as a call from the subscriber to the subscriber's voice mail, or a call from a third party that is not connected to the subscriber). At step 326, a first leg of the call is set up from the RAN to a media gateway system. At step 328, a second leg of the call is set up from the media gateway system to an automated voice response system. At step 330, the automated voice response system prompts the caller to select a voice mail system from among a plurality of voice mail systems. At step 332, the automated voice response system receives a selection of a voice mail system from the caller. At step 334, the second leg is then connected instead from the media gateway system to the selected voice mail system for handling.

(In an alternative embodiment, the call can remain connected through the automated voice response system, to the selected voice mail system. And in another alternative embodiment, the automated voice response system can itself function as the selected voice mail system, in which case the second leg can remain connected to the automated voice response system but can then be handled as a call to voice mail would be handled.)

d. SCP-based Selective Voice Mail Routing

In an alternative embodiment, SCP 32, alone or in combination with one or more intelligent peripherals or other entities, can provide for selective voice mail routing. By way of example, if MSC 22 determines that a call cannot be connected to the called WCD, MSC 22 may encounter a WIN trigger that causes MSC 22 to signal up to SCP 32. SCP 32 may then responsively consult the WCD's profile record and determine which of multiple voice mail systems should receive the call.

In the exemplary embodiment, the MSC 22 would have trunk connections (not shown) or other links with the various voice mail systems, such as servers 60 and 86, so MSC 22 can set up the call to a selected voice mail system via such a trunk. Alternatively, MSC 22 could set up the call to a selected voice mail system via media gateway system 74.

As with the process described above, for instance, the SCP may direct the MSC to set up the call to a given voice mail system if the WCD is currently checked-into the cellular-PBX integration service, and the SCP may direct the MSC to set up the call to a different voice mail sever if the WCD is currently checked-out of the cellular-PBX integration service. The SCP could apply still other logical conditions as a basis to select which voice mail system should receive the call.

Alternatively, the SCP could first direct the MSC 22 to set up the call to a voice response platform that can operate in the manner described above to allow the caller to select a voice mail system, and the voice response platform may signal to the SCP to instruct the SCP which voice mail system should receive the call. The SCP may then direct the MSC 22 to set up the call to the selected voice mail system. Other arrangements are possible as well.

8. Temporary Bypass or Application of Cellular-PBX Integration

As presently contemplated, the selective check-in/check-out logic described above will enable a user to effectively activate or deactivate the cellular-PBX integration service. In some instances, however, a WCD user may want to temporarily bypass or apply the cellular-PBX integration feature, without turning on or off the service. For instance, when the WCD's profile indicates that the WCD is checked-in, the user of the WCD may want to place a personal call that does not get routed through the IP PBX system. Similarly, when the WCD's profile indicates that the WCD is checked-out, the user may want to place a call through the IP PBX system.

To account for this desire, logic can be added to enable a WCD user to bypass or apply cellular-PBX integration on a per-call basis. That is, logic may be provided to allow a user to check-in or check-out a WCD on a per-call basis, possibly overriding the normal check-in/check-out status indicated by the WCD's profile. Two embodiments of this process are described in the following subsections, again with understanding that numerous variations are possible.

a. Feature-Code Based Per-Call Bypass or Application

According to a first embodiment, when a user dials a call on WCD, the user can include with the dialed digits a predefined feature code that will toggle the cellular-PBX integration function for that call only. If the WCD is currently checked-in, the feature code will cause cellular-PBX integration to not apply for the call, and if the WCD is currently checked-out, the feature code will cause the cellular-PBX integration function to apply for the call. Alternatively, separate "bypass" and "apply" feature codes could be defined respectively for not applying cellular-PBX integration and for applying cellular-PBX integration.

When the WCD sends a call origination request with such a feature code appended to the dialed digits, the MSC 22 can signal to SCP 32, and SCP 32 can respond to the feature code by either directing the MSC 22 to connect the call to media gateway system 74 or not. For instance, if the feature code is a temporary bypass directive (or if SCP profile data indicates that the WCD is currently checked-in and the feature code is a toggle code), then the SCP would preferably direct the MSC 22 to handle the call as a normal cellular call, without causing the call to be routed to the media gateway system 74 and CSCF 76. On the other hand, if the feature code is a temporary apply directive (or if SCP profile data indicates that the WCD is currently checked-out and the feature code is a toggle code), then the SCP would preferably direct the MSC 22 to set up the call to the media gateway system, and cellular-PBX processing would occur as described above.

As an alternative, the dialed feature code can accompany the dialed digits that are provided in a SIP signaling message to CSCF 76, and CSCF 76 or an applicable policy server (such as TOD policy server 94 for instance) can be invoked based on the feature code to determine whether to apply cellular-PBX integration or not. The process described above for call handling in response to a "check-out" or "check-in" determination would then occur. Thus, CSCF 76 would either route the call to IP PBX 50 (if cellular-PBX integration is to be applied for the call) or back to the media gateway system 74 (if cellular-PBX integration is not to be applied for the call).

b. IVR Prompted Selection to Bypass or Apply

In another embodiment, the IVRU function described above with respect to the VM policy server 98 can be varied in a way that will let the WCD user select whether to bypass or use the cellular-PBX integration service for the current call. Alternatively, a separate IVRU or other automated voice response system can be provided to carry out the function in a similar manner, with or without also relating to voice mail server selection.

In this embodiment, by way of example, the HSS profile for the WCD will specify that when the WCD calls its own number, the WCD user may be prompted not only to select a voice mail server to receive the call, but also with an option to dial digits that will be out-dialed without passing through the IP PBX server 50, i.e., to bypass cellular-PBX integration.

Based on such a profile, for instance, when CSCF 76 receives a SIP INVITE seeking to set up a call from WCD 14 to WCD 14, the CSCF would dip into HSS 82 as described above and would receive information that causes the CSCF to set up the call to the IVRU and to direct the IVRU to prompt the caller for a selection. The prompt may, for instance, state "Press 1 for personal voice mail, press 2 for corporate voice mail, or press 3 to dial digits and place a call without cellular-PBX integration."

Once the IVRU plays out such a prompt, if the user selects "3", the IVRU may then prompt the user to dial digits in order to place a phone call. Upon receipt of the dialed digits, the IVRU may then set up and bridge a call to the dialed number, or the IVRU may send a SIP REDIRECT or similar message as above seeking to set up a call to the dialed number, without involving IP PBX server 50. An analogous process could be carried out to enable a WCD user to selectively apply cellular-PBX integration, rather than selectively bypassing cellular-PBX integration.

c. Example Process Flow

Figure 10:
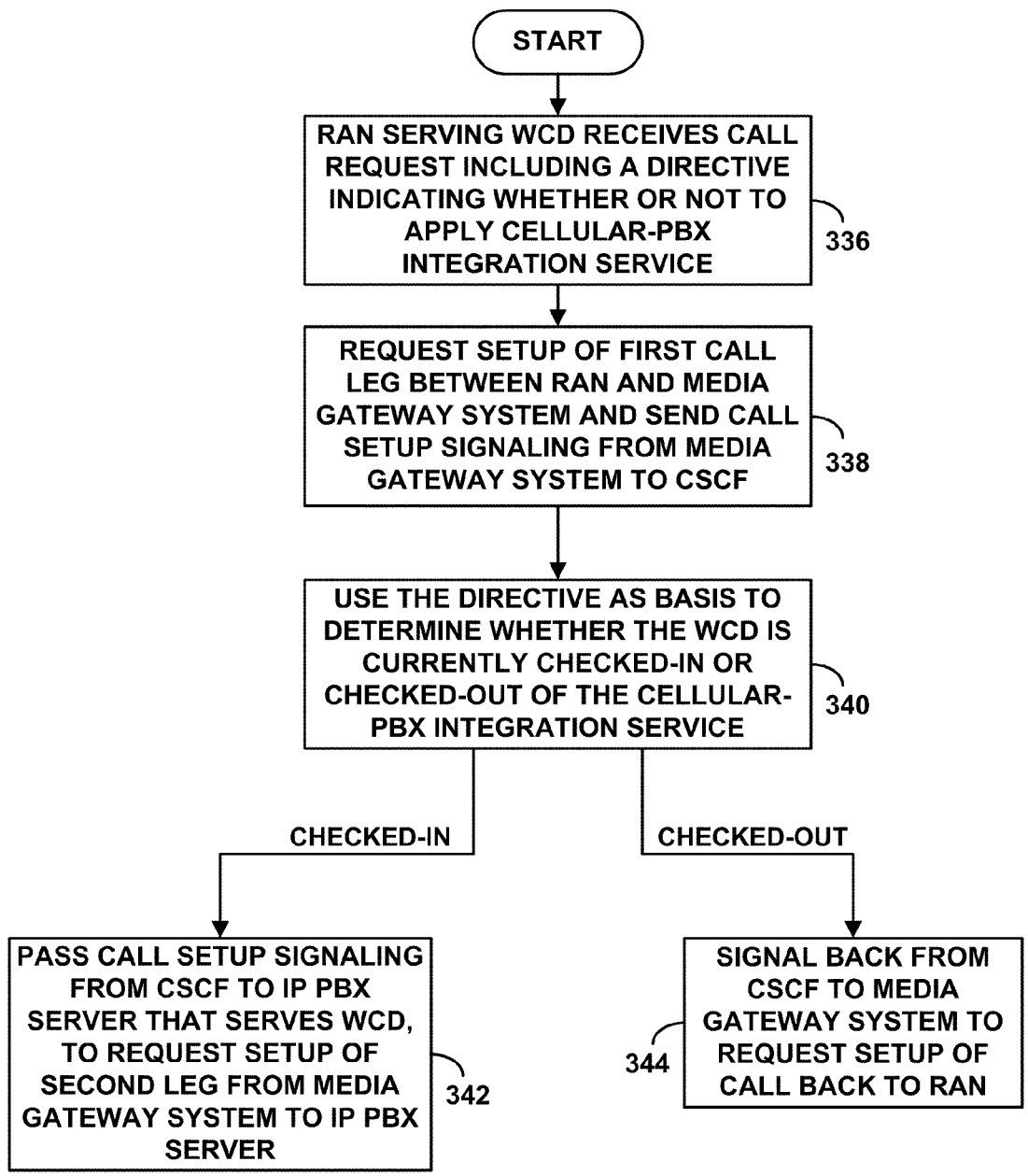

FIG. 10 is a flow chart depicting an example set of functions that can be carried out to provide for temporary bypass or application of cellular-PBX integration service. As shown in FIG. 10, at step 336, a RAN serving the WCD receives a call request for the WCD, the call request including a directive of whether or not to apply cellular-PBX integration service for the call. At step 338, a first leg of the call is requested to be set up between the RAN and a media gateway system, and call setup signaling is sent from the media gateway system to a CSCF.

At step 340, the directive is used as a basis to determine whether the WCD is currently checked-into or checked-out of the cellular-PBX integration service. For instance, if the directive is to apply cellular-PBX integration, then the determination may be that the WCD is considered checked-into the cellular-PBX integration service (e.g., even if just for the present call), and if the directive is to not apply cellular-PBX integration, then the determination may be that the WCD is considered checked-out of the cellular-PBX integration service (e.g., even if just for the present call).

If the determination is that the WCD is checked-in, then, at step 342, the call setup signaling is passed from the CSCF to an IP PBX server that serves the WCD, to request set up of a second leg of the call from the media gateway system to the IP PBX server. On the other hand, if the determination is that the WCD is currently checked-out, then, at step 344, then signaling is passed back from the CSCF to the media gateway system to request setup of the call back from the media gateway system to the RAN.

9. Location-Based Restriction on Cellular-PBX Integration

As explained above, integrating cellular telephone service with IP PBX service will advantageously enable a WCD user to enjoy numerous IP PBX features, such as the ability to place and receive PBX extension-dialed calls, and the ability to place outside calls through the IP PBX server (e.g., using the enterprise's PSTN service provider), for instance.

For various reasons, however, it may be desirable to limit the locations where cellular-PBX integration can apply. For example, it may be desirable to limit cellular-PBX integration to apply only when the WCD is in one or more specified locations or only when the WCD is not in one or more specified locations. To reduce the burden on the IP PBX system and the enterprise network, for instance, an enterprise IP PBX administrator may wish to prevent a WCD from using of cellular-PBX integration service when the WCD is in located anywhere other than a designated "home" area.

To account for this desire, logic can be added to restrict application of cellular-PBX service based on the location of the WCD. Two example embodiments for carrying out this function are described in the following subsections.

a. SCP-Based Location Restriction

In a first embodiment, the WCD's profile at the SCP 32 will indicate one or more location-based restrictions for application of cellular-PBX integration service. Generally, speaking, the location-based restrictions may define one or more location "zones" in which cellular-PBX integration service is to apply or is not to apply. Each such zone can be defined in various ways, examples of which include (i) geographic polygons, with nodes defined as latitude/longitude coordinates, (ii) cellular coverage areas, such as sectors, cells, or MSC serving areas, for instance, or (iii) political zones, such as streets, counties, cities or states, for instance. Other examples are possible as well.

In practice, when MSC 22 is faced with a request to connect a call to or from WCD 14, MSC 22 will signal to SCP 32 in a conventional manner. SCP 32 will then query the WCD's service profile record and thereby determine that the WCD subscribes to cellular-PBX integration service and that the service is location-restricted. In response, SCP 32 will determine the current location of the WCD.

The SCP can determine the current location of the WCD in various ways, depending for instance on the zone definitions that define the restriction at issue. By way of example, if the zone restriction is keyed to one or more MSC coverage areas, the SCP can determine the WCD's current MSC serving area based simply on which MSC signaled to the SCP, as indicated by a point-code or MSC-ID carried in the signaling message for instance. As another example, if a more granular location is required, the SCP could send a position-determination request via STP 26 to MPC 40, seeking a granular reading of the WCD's current location. Applying well known techniques, the MPC may then determine the WCD's location and report the location in a response message to the SCP. The SCP, MPC, or some other entity can further apply mapping data to convert a determined location into some other form, such as by converting geographic coordinates to a street address, city, or the like.

Provided with the location of the WCD, the SCP may then programmatically determine, based on the location and the location-restrictions defined by the WCD's profile (or generally applicable location-restriction logic), whether the call should be handled as a cellular-PBX integration call or not. For instance, if the WCD is located in an area where the profile logic indicates cellular-PBX integration service should apply, then the SCP would determine that cellular-PBX integration service should apply for the current call. Whereas, if the WCD is located in an area where the profile logic indicates cellular-PBS integration service should not apply, then the SCP would determine that cellular-PBX integration should not apply for the current call.

If the SCP thereby determines that cellular-PBX integration should apply, the SCP may instruct the MSC to set up the call to media gateway system 74, and processing would continue as described above. On the other hand, if the SCP determines that cellular-PBX integration should not apply, the SCP may instruct the MSC to handle the call as a conventional cellular call.

a. CSCF/HSS-Based Location Restriction

In another embodiment, the decision of whether to apply cellular-PBX integration can be made by the CSCF or by an associated location policy server 96. In this embodiment, the WCD's profile at HSS 82 will indicate one or more location-based restrictions for application of cellular-PBX integration service, defined in the manner described above for instance.

When CSCF 76 receives a SIP INVITE indicative of a call being placed to or from WCD in any of the scenarios described above for instance, the CSCF 76 will dip into HSS 82 and determine from the WCD's profile that a location-based restriction exists on application of cellular-PBX integration service. Further, the CSCF may thereby ascertain a domain name of location policy server 96, such as "location-policy.com". The CSCF may then responsively send the INVITE or a corresponding message to location policy server 96.

Upon receipt of the INVITE, the location policy server 96 may then itself dip into HSS 82 and thereby determine the applicable location-restrictions, such as the one or more zones in which cellular-PBX integration service is to apply or is not to apply. Further, the location policy server 96 may determine the current location of the WCD, by querying MPC 40 for instance.

The location policy server may thus programmatically determine, based on the WCD's location and the location-restrictions defined by the WCD's profile (or generally applicable location-restriction logic), whether the call should be handled as a cellular-PBX integration call or not. For instance, if the WCD is located in an area where the profile logic indicates cellular-PBX integration service should apply, then the location policy server 96 would determine that cellular-PBX integration service should apply for the current call. Whereas, if the WCD is located in an area where the profile logic indicates cellular-PBS integration service should not apply, then the location policy server 96 would determine that cellular-PBX integration should not apply for the current call.

If the location policy server 96 thereby determines that cellular-PBX integration should apply, the location policy server may signal back to the CSCF 76 to cause the CSCF to apply cellular-PBX integration. On the other hand, if the location policy server 96 determines that cellular-PBX integration should not apply, the location policy server may signal back to the CSCF 76 to cause the CSCF to not apply cellular-PBX integration. The function of applying or not applying cellular PBX integration can be carried out in the same manner as described above with respect to the check-in/check-out policy logic.

c. Example Process Flow

Figure 11:
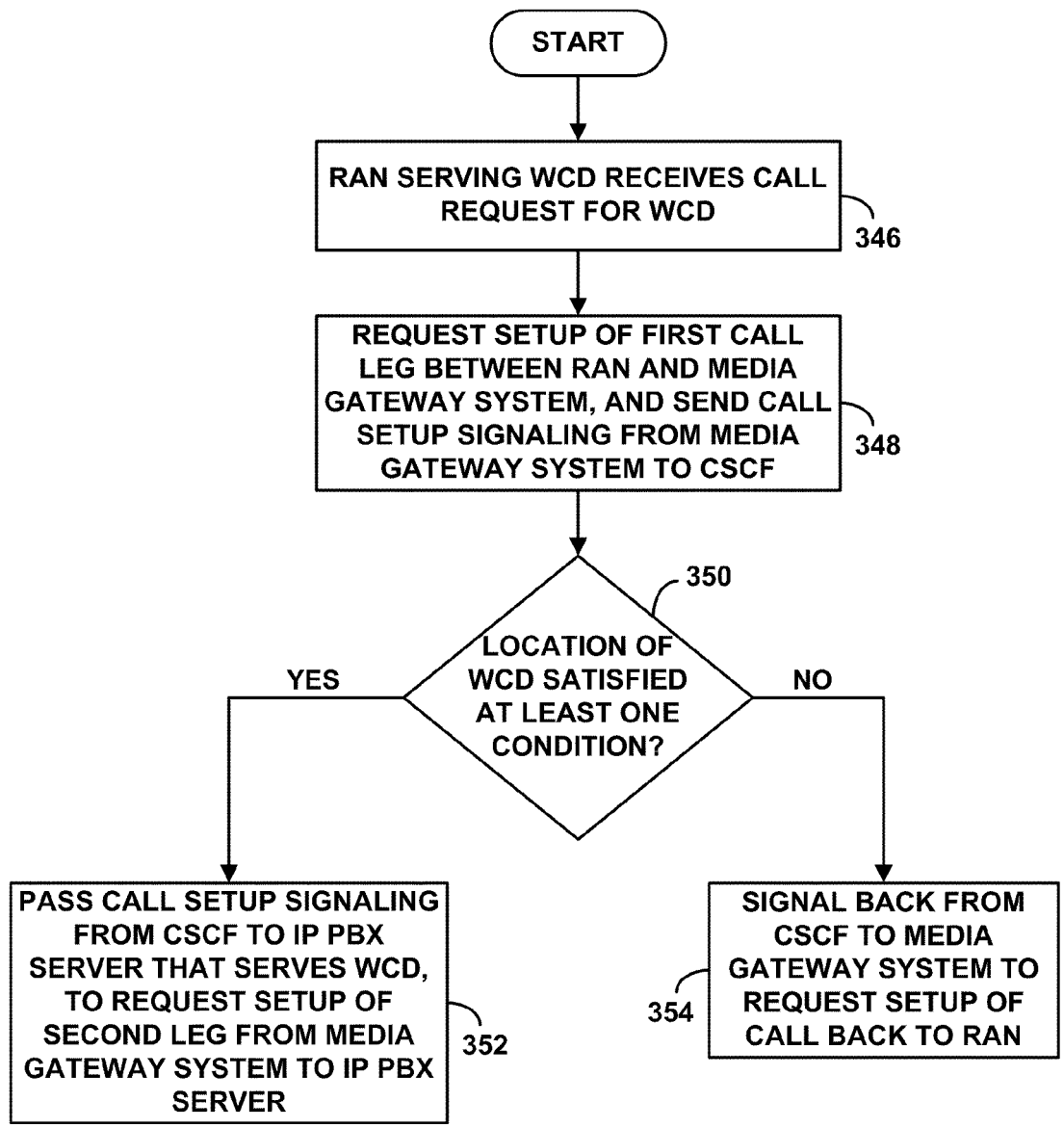

FIG. 11 is a flow chart depicting an example set of functions that can be carried out to provide for location-based restriction on application of cellular-PBX integration service. As shown in FIG. 11, at step 346, a RAN serving the WCD receives a call request for the WCD. At step 348, a first leg of the call is requested to be set up between the RAN and a media gateway system, and call setup signaling is sent from the media gateway system to a CSCF.

At step 350, a determination is made as to whether a location of the WCD satisfies at least one condition. If the determination is that the location of the WCD satisfies the at least one condition, then, at step 352, the call setup signaling is passed from the CSCF to an IP PBX server that serves the WCD, to request set up of a second leg of the call from the media gateway system to the IP PBX server. On the other hand, if the determination is that the location of the WCD does not satisfy the at least one condition, then at step 354, then signaling is passed back from the CSCF to the media gateway system to request setup of the call back from the media gateway system to the RAN.

10. Account Balance Restriction on Cellular-PBX Integration

For perhaps the same reasons that an enterprise might want to restrict application of cellular-PBX integration based on location, an enterprise might also want to restrict application of cellular-PBX integration based on the extent of use. For instance, an enterprise administrator may want to preclude a WCD user from using the cellular-PBX integration function more than a designated number of minutes per month. By the same token, a cellular carrier or other entity might want to restrict a WCD's use of cellular-PBX integration based on the extent of use.

To account for this desire, "account-balance" logic can be added. In particular, a WCD may be allotted a designated quantity of cellular-PBX integration service, possibly with a time restriction, such as per month or other billing period. The balance of minutes of use for a given WCD may then be decremented as the WCD uses the cellular-PBX integration service. And once the balance is exhausted, the WCD would be precluded from using further cellular-PBX integration service (e.g., during the applicable period).

To provide this account balance logic in a preferred embodiment, the WCD's profile will be provisioned initially (or periodically) with an account balance specifying an allowed quantity of use, such as a number of minutes of call time for instance. An entity that sits within the call signaling path between the cellular carrier's RAN 12 and the IP PBX server 50 will then decrement that account balance for the WCD as the WCD engages in cellular-PBX integration calls.

By way of example, the WCD's profile in HSS 82 can be provisioned with a value that indicates a number of allowed minutes of use of cellular-PBX integration service. Further, as shown in FIG. 4, an account-balance policy server 100 can be provided on network 90.

When CSCF 76 receives a SIP INVITE seeking to set up a call for WCD 14 from MGC 80 to IP PBX 50 or a SIP INVITE seeking to set up a call for WCD 14 from IP PBX 50 to MGC 80, CSCF 76 may perform some or all of the functions described above to determine whether the cellular-PBX integration service should be provided, such as whether the WCD is currently checked-into or checked-out of the cellular-PBX integration service.

Further, when CSCF 76 dips into the WCD's profile at HSS 82, the CSCF 76 will determine that the WCD is subject to an account-balance restriction, and the CSCF 76 may receive a domain name of account balance policy server 100, such as "account-balance-policy.com" In response, the CSCF 76 will thus preferably forward the SIP INVITE to the account-balance policy server 100.

Upon receipt of the SIP INVITE, the account balance policy server 100 may itself then dip into the WCD's HSS profile, to determine the current account balance for the WCD, such as how many minutes of use the WCD has left. (Alternatively, the CSCF 76 could provide this information in a SIP header parameter to the account balance policy server when forwarding the SIP INVITE to the server.) Based on the remaining balance, the account-balance policy server 100 may then determine whether the WCD has a sufficient balance to proceed with the cellular-PBX integration call that is being set up. For this purpose, a balance can be considered sufficient if it is non-zero or if it surpasses some other designated threshold level (such as 5 minutes for instance.)

If the account balance policy server 100 determines that the WCD does not have a sufficient remaining balance, the account balance policy server 100 will send a response message back to CSCF 76 directing CSCF 76 to not apply cellular-PBX integration. Processing would then occur as described above (as when the PE policy server 94 determines that the WCD is not currently checked-into the system).

On the other hand, if the account balance policy server 100 determines that the WCD does have a sufficient balance, the account balance policy server 100 would then forward the received SIP INVITE back to the CSCF 76 for transmission in turn to the destination SIP entity. For example, if the SIP INVITE had originated at MGC 80 and passed to CSCF 76 and then to account balance policy server 100, the INVITE could then pass back to CSCF 76 and, from there, along to IP PBX server 50 for IP PBX handling. As another example, if the SIP INVITE had originated at IP PBX server 50 and passed to CSCF 76 and then to account balance policy server 100, the INVITE could then pass back to CSCF 76 and, from there, along to MGC 80 for signaling in turn to MSC 22.

In this manner, the account balance policy server 100 will remain within the SIP signaling path for the call being set up. Additional SIP messages used to set up the call, such as SIP 200 OK and SIP ACK messages, would pass between the SIP endpoints (e.g., MGC 80 and IP PBX server 50) through the account balance policy server 100. Thus, the account balance policy server would see when the call is fully set up, such as when a SIP ACK passes between the endpoints. Further, SIP messages used to tear down the call, such as a SIP BYE message for instance, would also pass through the account balance policy server 100, and so the account balance policy server would also see when the call ends.

In accordance with the exemplary embodiment, as the call proceeds, the account balance policy server 100 will programmatically decrement the WCD's account balance. When the call ends, the account balance policy server 100 may then write the WCD's new account balance into the WCD's HSS profile record.

Further, if the WCD exhausts the balance during a call, the account balance policy server 100 can take a predefined action in response. By way of example, the account balance policy server 100 can automatically tear down the call, such as by sending a SIP BYE to one or more of the SIP endpoints. Alternatively or additionally, the account balance policy server 100 can redirect the WCD to a balance refreshment platform (e.g., IVRU) such as by sending a SIP REDIRECT to the SIP signaling initiator. As still another example, the account balance policy server 100 can allow the existing call to complete normally and can then bar initiation of a new call due to the exhausted balance. Other examples are possible as well.

In an alternative embodiment, some or all of this account balance logic can be provided by SCP 32, using WIN prepaid triggers for instance. In particular, the WCD's profile at SCP 32 can be provisioned with a value that indicates a number of allowed minutes of use of cellular-PBX integration service. SCP 32 can then apply account balance logic to determine whether to direct MSC 22 to connect a call to media gateway system 74 in the first place and can decrement the account balance as the call proceeds. When the call ends, MSC 22 can then signal to the SCP, and the SCP can stop decrementing the WCD's account balance.

Figure 12:
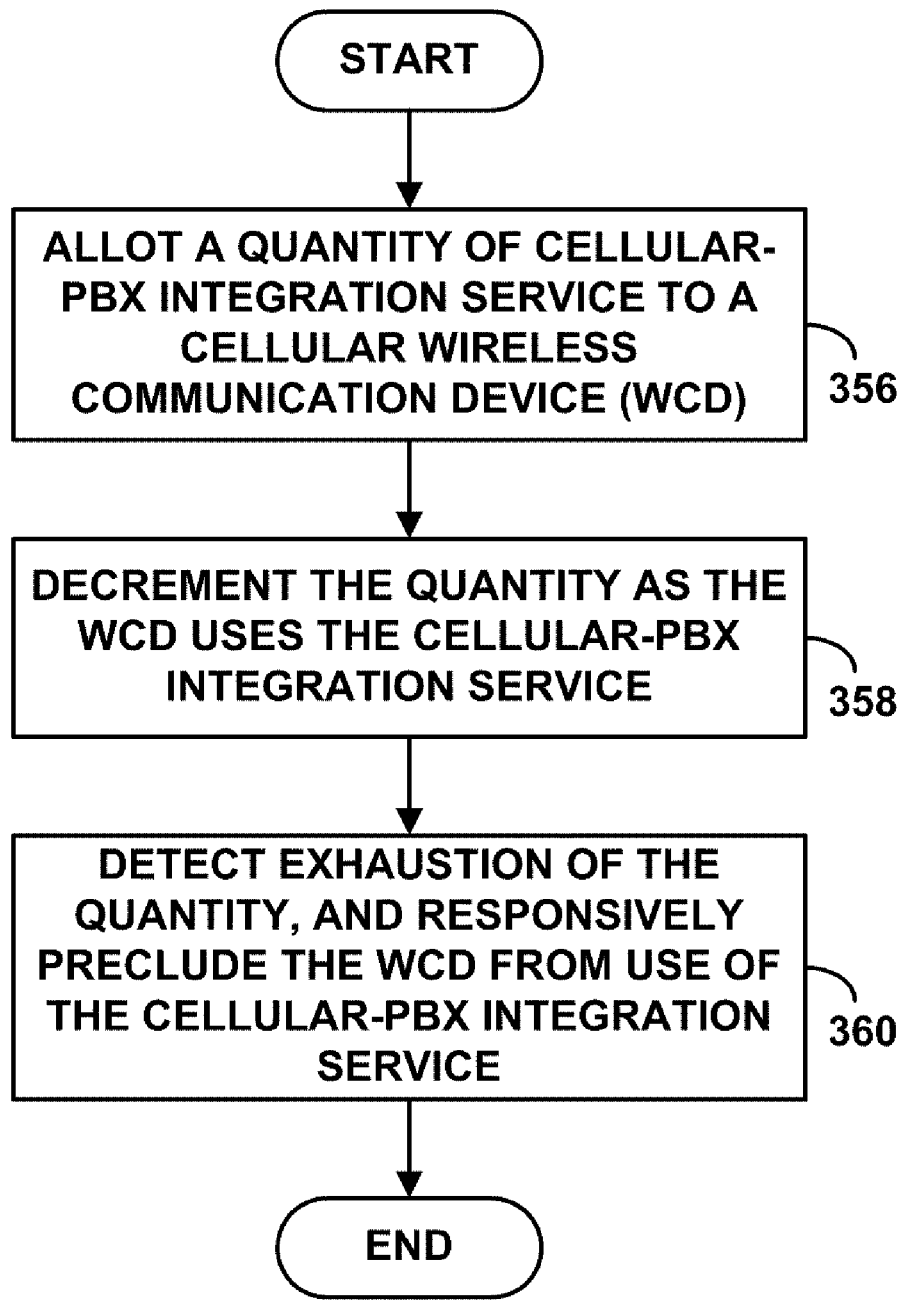

FIG. 12 is a flow chart depicting an example set of functions that can be carried out to provide for account-balance based restriction on application of cellular-PBX integration service. As shown in FIG. 12, at step 356, a quantity of cellular-PBX integration service is allotted to a WCD. At step 358, the quantity is decremented as the WCD uses the cellular-PBX integration service. And at step 360, the WCD is precluded from using the cellular-PBX integration service in response to the quantity being exhausted.

11. Differential Billing with Cellular-PBX Integration

In a typical cellular wireless communication system, a switch such as MSC 22 will generate a call detail record (CDR) for each call that it handles, and the switch will send each CDR to a billing system, to facilitate billing of the WCD account holder. The CDR typically identifies the WCD that placed or received the call, the directory number of the other party, and the duration of the call, among other information.

With cellular-PBX integration, another issue that arises is what entity the cellular carrier should bill for such calls. On the one hand, the cellular carrier could bill the WCD account holder for a call. On the other hand, the cellular carrier could bill the WCD's associated IP PBX service provider (enterprise) for a call.

In accordance with an exemplary embodiment, this issue can be resolved by billing cellular-PBX integration calls to the IP PBX service provider, and billing the WCD account holder (e.g., the WCD user personally) for non-cellular-PBX integration calls. (In some instances, the same entity might be the IP PBX service provider (enterprise) and the WCD account holder; this exemplary embodiment can be applied even in that instance, to facilitate separate accounting for the two types of calls.)

One way to do this in practice is to have SCP 32 provide a differential billing indicator in the intelligent network response message that it sends to the MSC 22 during call origination or termination. For instance, in an "orreq_rr" response message that the SCP sends back to the MSC during call origination, the SCP may include (in a user-definable field or in some other MSC-discernable manner) a "personal" billing-indicator indicating that the WCD account holder should be billed for the call or an "enterprise" billing indicator indicating that the IP PBX service provider should be billed for the call.

More particularly, when the SCP is directing the MSC to set up the call to media gateway system 74, the SCP can include an "enterprise" billing-indicator, whereas, when the SCP is directing the MSC to set up the call as a non-cellular-PBX integration call, the SCP can include a "cellular" billing-indicator. Alternatively, the MSC can be programmed to treat a directive to set up the call to media gateway system 74 as an indication that the call is to be billed to one party (the enterprise) and a directive to set up the call conventionally as an indication that the call is to billed to another party (the WCD account holder).

The MSC 22 may then programmatically include in the CDR that it generates for the call a corresponding "personal" or "enterprise" billing indicator (in any predefined form). In turn, a billing system that receives the CDR may record the call in the appropriate account, so as to bill the IP PBX service provider for cellular-PBX integration calls and the WCD account holder for other calls.

Figure 13:
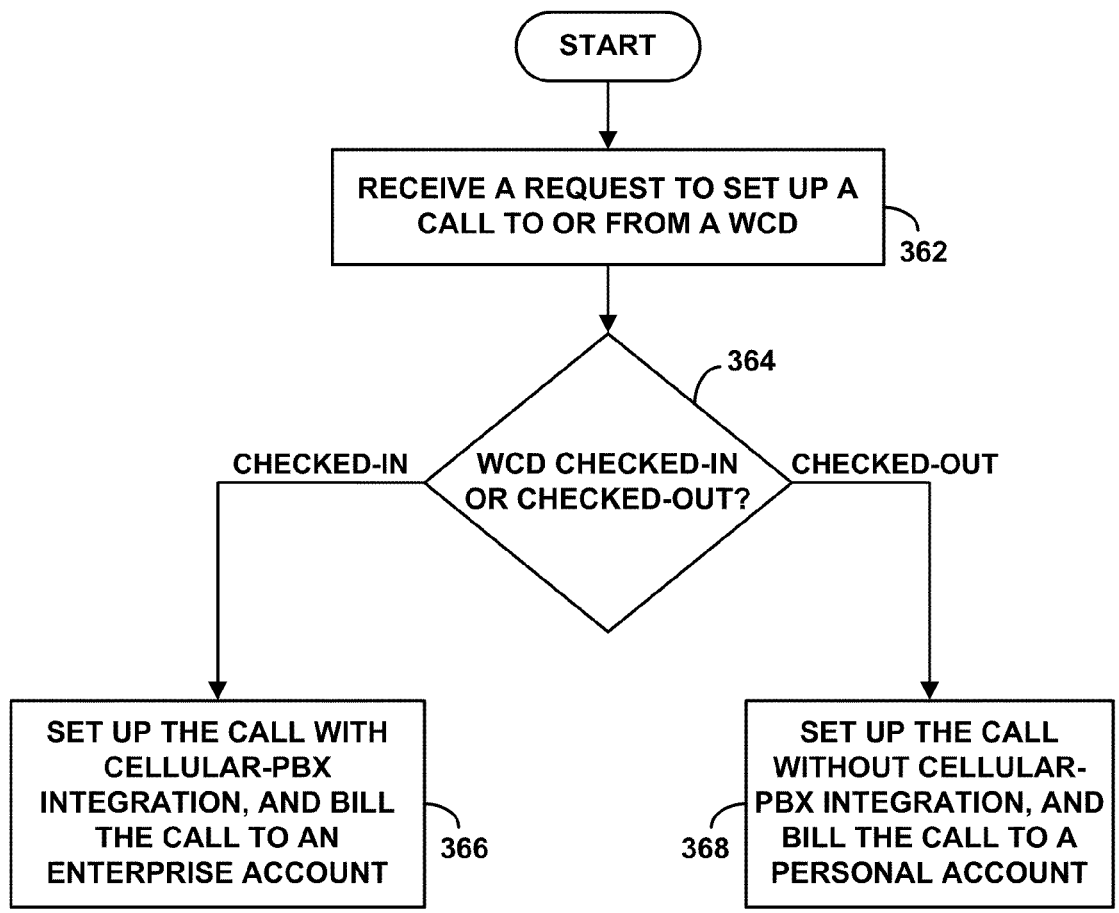

FIG. 13 is a flow chart depicting an example set of functions that can be carried out to provide for differential billing with cellular-PBX integration service. As shown in FIG. 13, at step 362, request to set up a call to or from a WCD is received. At step 364, a determination is made as to whether the WCD is currently checked-into or checked-out of cellular-PBX integration service. If the determination is that the WCD is currently checked-into cellular-PBX integration service, then at step 366, the call is set up with cellular-PBX integration, and the call is billed to an enterprise account. On the other hand, if the determination is that the WCD is currently checked-out of cellular-PBX integration service, then, at step 368, the call is set up without cellular-PBX integration, and the call is billed to a personal account.

12. Conclusion

Exemplary embodiments of the present invention have been described above. Those skilled in the art will understand, however, that changes and modifications may be made to these embodiments without departing from the true scope and spirit of the present invention, which is defined by the claims.

For example, various functions described above as being carried out by CSCF 76 in conjunction with one or more policy servers could be carried out by CSCF 76 alone, by MGC 80, or by one or more other entities involved with call setup and management. As another example, various functions described above could be combined together or conducted in series. For instance, the CSCF 76 can signal in series to multiple policy servers, in order to facilitate application of multiple policies related to cellular-PBX integration for a given call. Similarly, the SCP 32 can apply multiple polices related to cellular-PBX integration for a given call.

As still another example, while the foregoing description uses the term "WCD" and discusses application of cellular-PBX integration service and connection of calls for a WCD, it should be understood the a WCD can generally constitute a wireless subscriber, which can be a device and/or a user of the device. Thus, a policy or state can be set or applied for a given user's WCD by setting or applying the policy or state for the given user, and a policy or state can be set or applied for a given user by setting or applying the policy or state for the given user's WCD. Other examples are possible as well.

We claim:

1. A method comprising:
    receiving into a cellular radio access network (RAN) a call request seeking to set up a call for a cellular wireless communication device (WCD) that is operating in a wireless coverage area of the RAN, wherein the call is a call to a called party;
    responsively making a determination of whether the WCD is currently checked-into a cellular-PBX integration service to which the WCD subscribes;
    if the determination is that the WCD is currently checked-into the cellular-PBX integration service, then setting up the call to an IP PBX server that serves the WCD; and
    if the determination is that the WCD is not currently checked-into the cellular-PBX integration service, then setting up the call to the called party without setting up the call to the IP PBX server,
    the method further comprising maintaining a subscriber profile record for the WCD, wherein the subscriber profile record includes an indication of whether the WCD is currently checked-into or checked-out of the cellular-PBX integration service,
    wherein making the determination of whether the WCD is currently checked-into the cellular-PBX integration service comprises referring to the subscriber profile record to determine whether the WCD is currently checked-into or checked-out of the cellular PBX integration service.

2. The method of claim 1, further comprising:
    after setting up the call to the IP PBX server, setting up the call from the IP PBX server for the WCD.

3. The method of claim 2,
    wherein the call is a call to the WCD, and
    wherein setting up the call from the IP PBX server for the WCD comprises performing a function selected from the group consisting of (i) ringing the WCD, (ii) simultaneously or sequentially ringing the WCD and a designated IP PBX extension, and (iii) sending the call to a voice mail box associated with the IP PBX server.

4. The method of claim 2,
    wherein the IP PBX server includes data that associates an IP PBX extension number with the WCD,
    wherein the call is a call to the extension number, and
    wherein setting up the call from the IP PBX server for the WCD comprises performing a function selected from the group consisting of (i) ringing the WCD, (ii) simultaneously or sequentially ringing the WCD and a designated IP PBX extension, and (iii) sending the call to a voice mail box associated with the IP PBX server.

5. The method of claim 2,
wherein the call is dialed from the WCD to a called number, and
wherein setting up the call from the IP PBX server for the WCD comprises setting up the call from the IP PBX server to the called number.

6. The method of claims 5,
wherein the called number is a directory number, and
wherein setting up the call from the IP PBX server to the called number comprises setting up the call from the IP PBX server over the public switched telephone network to the directory number.

7. The method of claim 5,
wherein the called number is an IP PBX extension number, and
wherein setting up the call from the IP PBX server to the called number comprises setting up the call from the IP PBX server to an IP PBX extension phone having the IP PBX extension number.

8. The method of claim 1, wherein the cellular RAN includes a base station that radiates to define the wireless coverage area and a mobile switching center (MSC) that is communicatively linked with the base station, wherein the MSC is further communicatively linked with a service control point (SCP) to which the MSC signals for call processing guidance in response to the call request, and wherein:
making the determination of whether the WCD is currently checked-into the cellular-PBX integration service comprises the SCP determining whether the WCD is currently checked-into the cellular-PBX integration service, and
setting up the call to the IP PBX server that serves the WCD comprises the SCP instructing the MSC to set up the call to a media gateway system for connection of the call thereafter from the media gateway system to the IP PBX server.

9. The method of claim 8,
wherein maintaining a subscriber profile record for the WCD comprises maintaining the subscriber profile record at the SCP, and
wherein referring to the subscriber profile record comprises the SCP referring to the profile record.

10. The method of claim 8, further comprising:
receiving, from a user, a provisioning instruction to check the WCD into or out of the cellular-PBX integration service; and
responsively provisioning the profile record to accordingly indicate whether the WCD is currently checked-into or checked-out of the cellular PBX integration service.

11. The method of claim 10, wherein receiving the provisioning instruction from the user comprises receiving the provisioning instruction through a web-based provisioning interface or receiving the provisioning instruction as a feature-code provisioning instruction.

12. The method of claim 1, wherein the WCD operates under a WCD billing-account, and wherein the IP PBX server operates under an enterprise billing-account, the method further comprising:
if the determination is that the WCD is currently checked-into the cellular-PBX integration service, then charging the call to the enterprise billing-account; and
if the determination is that the WCD is currently not checked-into the cellular-PBX integration service, then charging the call to the WCD billing-account.

13. The method of claim 12, wherein the cellular RAN includes a base station that radiates to define the wireless coverage area and a mobile switching center (MSC) that is communicatively linked with the base station, wherein the MSC is further communicatively linked with a service control point (SCP) to which the MSC signals for call processing guidance in response to the call request, and wherein:
making the determination of whether the WCD is currently checked-into the cellular-PBX integration service comprises the SCP determining whether the WCD is currently checked-into the cellular-PBX integration service;
charging the call to the enterprise billing-account comprises the SCP including an enterprise-billing indicator in a directive that the SCP sends to the MSC; and
charging the call to the WCD billing-account comprises the SCP including a WCD-billing indicator in a directive that the SCP sends to the MSC.

14. The method of claim 1, further comprising:
receiving together with the call request a toggle command,
wherein making the determination comprises (i) referring to the profile record to ascertain whether the WCD is currently checked-into or checked-out of the cellular-PBX integration service, (ii) if the profile record indicates that the WCD is currently checked-into the cellular-PBX integration service, then determining in view of the toggle command that the WCD is currently not checked-into the cellular-PBX integration service, and (iii) if the profile record indicates that the WCD is currently checked-out of the cellular-PBX integration service, then determining in view of the toggle command that the WCD is currently checked-into the cellular-PBX integration service.

15. The method of claim 14, wherein the toggle command comprises a feature code.

16. The method of claim 1,
wherein the call is a call between the WCD and a party other than the WCD, and
wherein making the determination of whether the WCD is currently checked-into a cellular-PBX integration service to which the WCD subscribes comprises basing the determination at least in part on an identity of the party other than the WCD.

17. A method comprising:
receiving into a cellular radio access network (RAN) a call request seeking to set up a call for a cellular wireless communication device (WCD) that is operating in a wireless coverage area of the RAN, wherein the call is a call to a called party;
receiving together with the call request a directive of whether or not to apply cellular-PBX integration service for the call;
responsively making a determination of whether the WCD is currently checked-into a cellular-PBX integration service to which the WCD subscribes, wherein if the directive is to apply cellular-PBX integration service for the call, then the determination is that the WCD is checked into the cellular-PBX integration service, and if the directive is to not apply cellular-PBX integration service for the call, then the determination is that the WCD is not currently checked-into the cellular-PBX integration service;
if the determination is that the WCD is currently checked-into the cellular-PBX integration service, then setting up the call to an IP PBX server that serves the WCD; and
if the determination is that the WCD is not currently checked-into the cellular-PBX integration service, then setting up the call to the called party without setting up the call to the IP PBX server.

18. The method of claim 17, wherein the directive comprises a feature code.

19. A system comprising:
- a cellular radio access network (RAN) comprising a base station that radiates to produce a wireless coverage area;
- subscriber profile data indicating whether a cellular wireless communication device (WCD) is currently checked-into or checked-out of a cellular-PBX integration service to which the WCD subscribes;
- a media gateway system;
- a call session control function (CSCF) arranged to engage in signaling communication with the media gateway system; and
- an IP PBX server arranged to serve a plurality of enterprise telephone stations that are situated on an enterprise packet-switched network, the IP PBX server being further arranged to engage in signaling communication with the CSCF and bearer communication with the media gateway system,
- wherein the RAN receives a request to set up a call for the WCD when the WCD is operating in the wireless coverage area and, responsive to the profile data indicating that WCD is currently checked-into the cellular-PBX integration service, the RAN sets up the call to the media gateway system for connection of the call in turn to the IP PBX server.

* * * * *